US012542090B2

(12) United States Patent
Gong

(10) Patent No.: US 12,542,090 B2
(45) Date of Patent: Feb. 3, 2026

(54) DISPLAY APPARATUS AND VEHICLE

(71) Applicant: LG Display Co., Ltd., Seoul (KR)

(72) Inventor: Changseon Gong, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/806,060

(22) Filed: Aug. 15, 2024

(65) Prior Publication Data

US 2025/0209965 A1 Jun. 26, 2025

(30) Foreign Application Priority Data

Dec. 20, 2023 (KR) ........................ 10-2023-0187094

(51) Int. Cl.
*G09G 3/30* (2006.01)
*G09F 13/22* (2006.01)

(52) U.S. Cl.
CPC ......... *G09G 3/30* (2013.01); *G09F 2013/227* (2013.01); *G09G 2300/0452* (2013.01); *G09G 2320/0257* (2013.01); *G09G 2320/0271* (2013.01); *G09G 2320/028* (2013.01); *G09G 2320/068* (2013.01); *G09G 2380/10* (2013.01)

(58) Field of Classification Search
CPC ............. G09G 3/30; G09G 2300/0452; G09G 2320/0257; G09G 2320/0271; G09G 2320/028; G09G 2320/068; G09G 2380/10; G09F 2013/227
See application file for complete search history.

(56) References Cited

U.S. PATENT DOCUMENTS

| | | | | |
|---|---|---|---|---|
| 7,978,167 B2 * | 7/2011 | Yabuta | G02F 1/13471 345/94 |
| 9,236,011 B2 * | 1/2016 | Mizukoshi | G09G 3/3233 |
| 10,078,979 B2 * | 9/2018 | Li | G09G 3/3233 |
| 10,354,575 B2 * | 7/2019 | Yang | G09G 3/3275 |
| 11,302,278 B2 * | 4/2022 | Kawashima | H10D 30/6733 |
| 11,315,509 B2 * | 4/2022 | Qiao | G09G 3/3614 |
| 11,430,368 B2 * | 8/2022 | Oh | G09G 3/3225 |
| 11,562,699 B2 * | 1/2023 | Park | G09G 3/3233 |

(Continued)

FOREIGN PATENT DOCUMENTS

| | | |
|---|---|---|
| KR | 20190135786 A | 12/2019 |
| KR | 102337377 B1 | 12/2021 |

(Continued)

*Primary Examiner* — Michael J Jansen, II
(74) *Attorney, Agent, or Firm* — Seed Intellectual Property Law Group LLP

(57) ABSTRACT

A display apparatus according to an example embodiment of the present disclosure comprises a display panel comprising a plurality of sub-pixels, a first power line shared by the plurality of sub-pixels, and a second power line shared by the pixels; a driver driving the display panel; a power management circuit applying a high potential power voltage to the first power line and applying a low potential power voltage to the second power line; and a sensing circuit sensing electrical characteristics of a sensing area of the display panel through the second power line to output sensing data, wherein the power management circuit applies in a display mode, a first low potential power voltage to the second power line, in a sensing mode, a second low potential power voltage higher than the first low potential power voltage to the second power line.

27 Claims, 27 Drawing Sheets

(56) References Cited

U.S. PATENT DOCUMENTS

| | | | | |
|---|---|---|---|---|
| 11,670,243 | B2 * | 6/2023 | Woo | G09G 3/3275 345/204 |
| 11,694,648 | B2 * | 7/2023 | Kawashima | G09G 3/3659 345/204 |
| 11,727,835 | B2 * | 8/2023 | Ha | G09G 3/3258 345/204 |
| 11,805,691 | B2 * | 10/2023 | Hong | G09G 3/3266 |
| 11,978,398 | B2 * | 5/2024 | Hong | H10K 59/8791 |
| 2007/0070004 | A1 * | 3/2007 | Yabuta | G02F 1/13471 345/87 |
| 2013/0050292 | A1 * | 2/2013 | Mizukoshi | G09G 3/3233 345/77 |
| 2017/0229056 | A1 * | 8/2017 | Li | G09G 3/3233 |
| 2018/0082625 | A1 * | 3/2018 | Yang | G09G 3/3233 |
| 2020/0193928 | A1 * | 6/2020 | Kawashima | G02F 1/1368 |
| 2021/0350757 | A1 * | 11/2021 | Qiao | G09G 3/3648 |
| 2022/0068184 | A1 * | 3/2022 | Oh | G09G 3/3275 |
| 2022/0139332 | A1 * | 5/2022 | Park | G09G 3/3283 345/214 |
| 2022/0157258 | A1 * | 5/2022 | Woo | G09G 3/3275 |
| 2022/0230600 | A1 * | 7/2022 | Kawashima | G09G 3/3659 |
| 2022/0270528 | A1 * | 8/2022 | Ha | G09G 3/006 |
| 2023/0215357 | A1 * | 7/2023 | Hong | H10K 59/40 345/174 |
| 2023/0217763 | A1 * | 7/2023 | Hong | G09G 3/3258 |
| 2024/0153459 | A1 * | 5/2024 | Chun | G09G 3/3233 |
| 2024/0178198 | A1 * | 5/2024 | Ji | H10H 20/855 |
| 2025/0209965 | A1 * | 6/2025 | Gong | G09G 3/3233 |

FOREIGN PATENT DOCUMENTS

| | | | |
|---|---|---|---|
| TW | 201921331 | A | 6/2019 |
| TW | 202303573 | A | 1/2023 |

* cited by examiner

DISPLAY APPARATUS AND VEHICLE

CROSS-REFERENCE TO RELATED APPLICATIONS

This application claims the priority and the benefit of the Korean Patent Applications No. 10-2023-0187094 filed on Dec. 20, 2023, which are hereby incorporated by reference in its entirety for all purposes, as if fully set forth herein.

BACKGROUND

Technical Field

The present disclosure relates to a display apparatus, and more particularly, to a display apparatus for afterimage compensation

Description of the Related Art

Electroluminescence display (ESD) devices have the advantages of high brightness, low driving voltage, ultra-thinness, and free shape realization by using spontaneous emitting elements.

To ensure long-term performance and reliability, as an example, electroluminescent display apparatus may compensate for afterimages, for example, by sensing changes in electrical characteristics as the emitting element deteriorates.

The description provided in the background section should not be assumed to be prior art merely because it is mentioned in or associated with the background section. The background section may include information that describes one or more aspects of the subject technology.

BRIEF SUMMARY

As an example, the electroluminescent display apparatus may drive sub-pixels in a time-division manner to control the viewing angle, without being limited thereto. In this case, the capacitance of the emitting element may be reduced by the division of the sub-pixels, which may reduce the sensing accuracy of changes in the electrical characteristics of the emitting element.

In an electroluminescent display apparatus, there is a need for a method to improve the sensing accuracy of the conversion of electrical characteristics of an emitting element regardless of driving sub-pixels in a time-division manner.

An aspect of the present disclosure is directed to providing a display apparatus capable of improving afterimage compensation performance by improving sensing accuracy for changes in electrical characteristics of an emitting element.

Technical features of embodiments of the present disclosure are not limited to those mentioned above, and other technical features not mentioned above will be apparent to those skilled in the art to which the technical ideas of the present disclosure belong from the following descriptions.

A display apparatus according to an example embodiment of the present disclosure comprises a display panel comprising a plurality of sub-pixels, a first power line shared by the plurality of sub-pixels, and a second power line shared by the pixels; a driver driving the display panel; a power management circuit applying a high potential power voltage to the first power line and applying a low potential power voltage to the second power line; and a sensing circuit sensing electrical characteristics of a sensing area of the display panel through the second power line to output sensing data, wherein the power management circuit applies in a display mode, a first low potential power voltage to the second power line, in a sensing mode, a second low potential power voltage higher than the first low potential power voltage to the second power line.

A display apparatus according to an example embodiment of the present disclosure comprises: a display panel comprising a plurality of sub-pixels, which comprise a first emitting element and a second emitting element, a first power line which is shared by the plurality of sub-pixels, and a second power line, which is shared by the plurality of sub-pixels; a sensing circuit sensing electrical characteristics of a sensing area of the display panel through the second power line to output sensing data; and a power management circuit, in the sensing mode, applying a high potential power voltage for a sensing mode and a set current to the first power line and applying a low potential power voltage for the sensing mode to the second power line, wherein each of the plurality of sub-pixels further comprising a pixel circuit, in a first viewing angle mode driving the first emitting element, and in a second viewing angle mode driving the second emitting, and wherein the power management circuit applies a higher positive voltage than a low potential power voltage for a display mode as a low potential power voltage for the sensing mode.

Specific details according to various example embodiments other than the above-mentioned challenges are included in the description and drawings below.

It is to be understood that both the foregoing general description and the following detailed description are example and explanatory and are intended to provide further explanation of the inventive concepts as claimed.

BRIEF DESCRIPTION OF THE SEVERAL VIEWS OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

Figure 1:
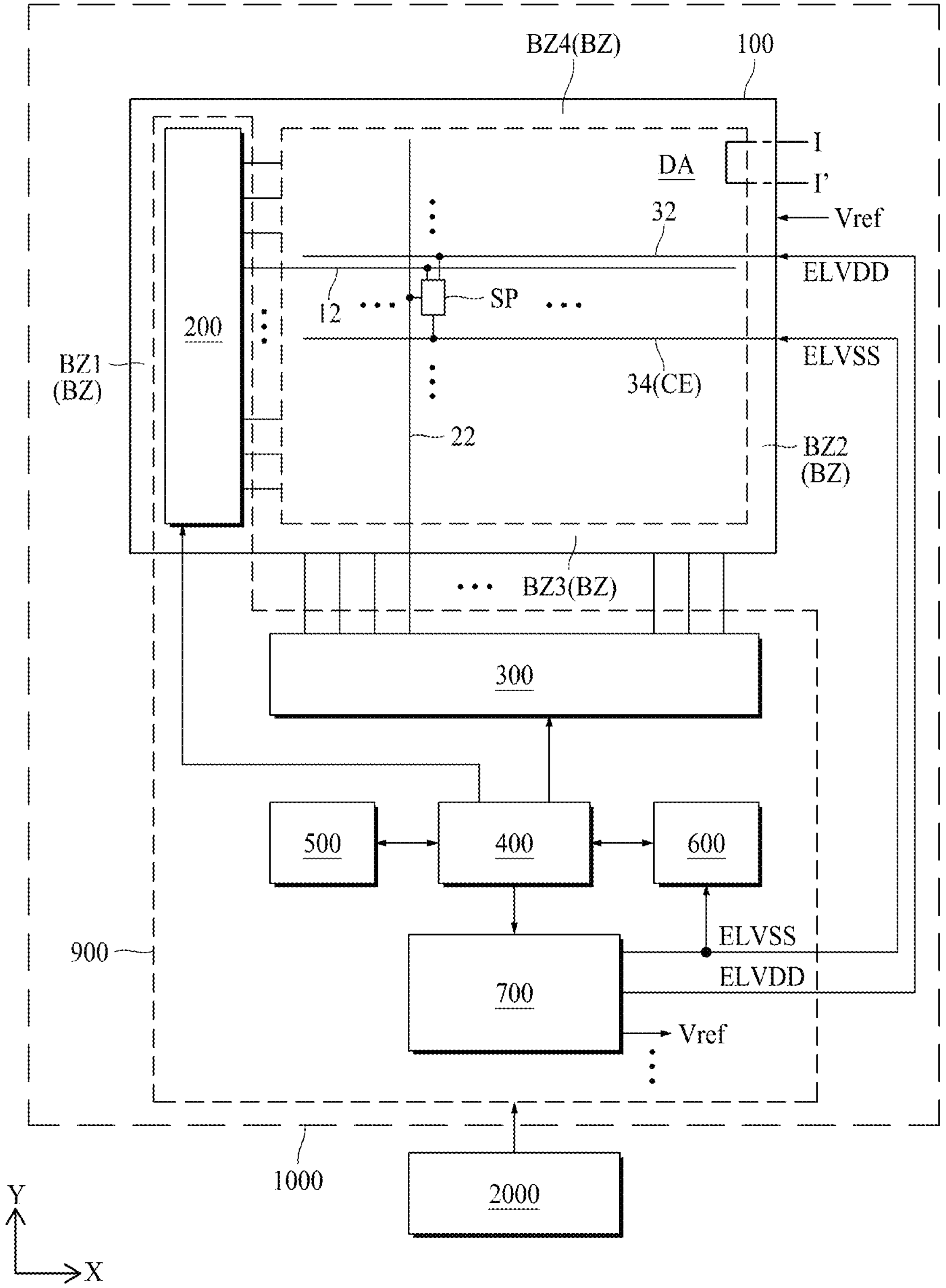
FIG. 1 is a block diagram schematically illustrating a configuration of a display apparatus, according to one example embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which may be illustrated in the accompanying drawings. The progression of processing steps and/or operations described is an example; however, the sequence of steps and/or operations is not limited to that set forth herein and may be changed as is known in the art, with the exception of steps and/or operations necessarily occurring in a particular order. Names of the respective elements used in the following explanations may be selected only for convenience of writing the specification and may be thus different from those used in actual products.

Advantages and features of the present disclosure, and implementation methods thereof will be clarified through following aspects described with reference to the accompanying drawings. The present disclosure may, however, be embodied in different forms and should not be construed as limited to the aspects set forth herein. Rather, these aspects are provided so that this disclosure will be thorough and complete, and will fully convey the scope of the present disclosure to those skilled in the art.

A shape (e.g., sizes, lengths, widths, heights, thicknesses, locations, radii, diameters, and areas), a ratio, an angle, and a number disclosed in the drawings for describing aspects of the present disclosure are merely an example, and thus, the present disclosure is not limited to the illustrated details. Like reference numerals refer to like elements throughout the specification. In the following description, when the detailed description of the relevant known function or configuration is determined to unnecessarily obscure the important point of the present disclosure, the detailed description will be omitted. In a case where 'comprise', 'have', and 'include' described in the present specification are used, another part may be added unless 'only' is used. The terms of a singular form may include plural forms unless referred to the contrary.

The word "example" is used to mean serving as an example or illustration. Aspects are example aspects. "Embodiments," "examples," "aspects," and the like should not be construed as preferred or advantageous over other implementations. An example embodiment, an example, an example embodiment, an aspect, or the like may refer to one or more embodiments, one or more examples, one or more example embodiments, one or more aspects, or the like, unless stated otherwise. Further, the term "may" encompasses all the meanings of the term "can."

In construing an element, the element is construed as including an error range although there is no explicit description. Any implementation described herein as an "example" is not necessarily to be construed as preferred or advantageous over other implementations.

In describing a position relationship, for example, when a position relation between two parts is described as "on," "over," "under," and "next," one or more other parts may be disposed between the two parts unless a more limiting term, such as "just" or "direct(ly)" is used.

The terms, such as "below," "lower," "above," "upper" and the like, may be used herein to describe a relationship between element item(s) as illustrated in the drawings. It will be understood that the terms are spatially relative and based on the orientation depicted in the drawings.

In describing a time relationship, for example, when the temporal order is described as, "after," "subsequent," "next," and "before," a case which is not continuous may be included unless a more limiting term, such as "just," "immediate(ly)," or "direct(ly)" is used.

It will be understood that, although the terms "first," "second," "A," "B," "(a)," and "(b)," etc., may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing the elements of the present disclosure, the terms “first,” “second,” “A,” “B,” “(a),” “(b),” etc., may be used. These terms are intended to identify the corresponding elements from the other elements, and basis, order, sequence, or number of the corresponding elements should not be defined or limited by these terms. As for the expression that an element or a layer is “connected,” “coupled,” or “adhered” to another element or layer, the element or layer may not only be directly connected or adhered to another element or layer, but also be indirectly connected or adhered to another element or layer with one or more intervening elements or layers “disposed” between the elements or layers, unless otherwise specified.

The term “at least one” should be understood as including any and all combinations of one or more among the associated listed elements. For example, the meaning of “at least one or more of a first element, a second element, and a third element” denotes the combination of all elements proposed from two or more of the first element, the second element, and the third element as well as the first element, the second element, or the third element.

Features of various aspects of the present disclosure may be partially or overall coupled to or combined with each other, and may be variously inter-operated with each other and driven technically as those skilled in the art may sufficiently understand. The aspects of the present disclosure may be carried out independently from each other, or may be carried out together in co-dependent relationship.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning for example consistent with their meaning in the context of the relevant art and should not be interpreted in an idealized or overly formal sense unless expressly so defined herein. For example, the term “part” or “unit” may apply, for example, to a separate circuit or structure, an integrated circuit, a computational block of a circuit device, or any structure configured to perform a described function as should be understood to one of ordinary skill in the art.

Hereinafter, the aspect of the present disclosure will be described with reference to the accompanying drawings. Since a scale of each of elements shown in the accompanying drawings is different from an actual scale for convenience of description, the present disclosure is not limited to the shown scale. Further, all the components of each display apparatus, display device, and display panel according to all aspects of the present disclosure are operatively coupled and configured.

Figure 2:
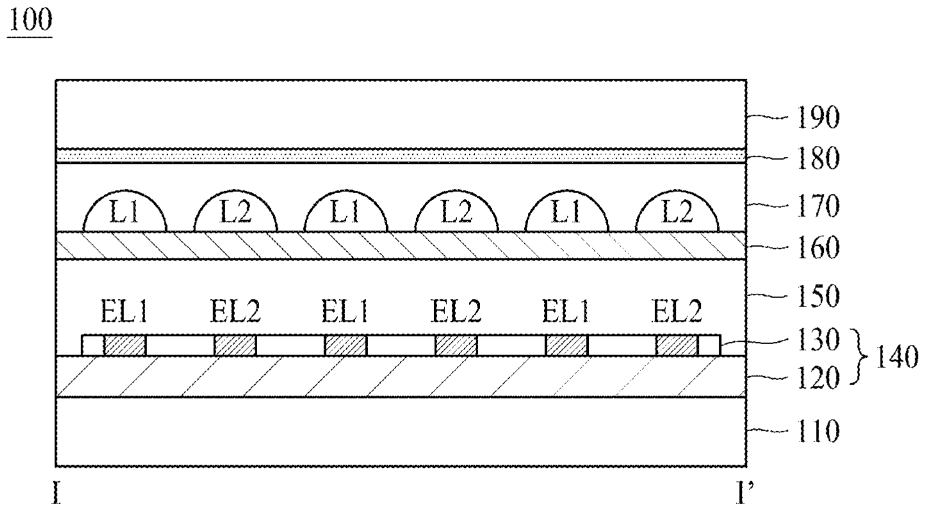
FIG. 2 is a schematic cross-sectional view of a display panel structure according to one example embodiment of the present disclosure.
Figure 3A:
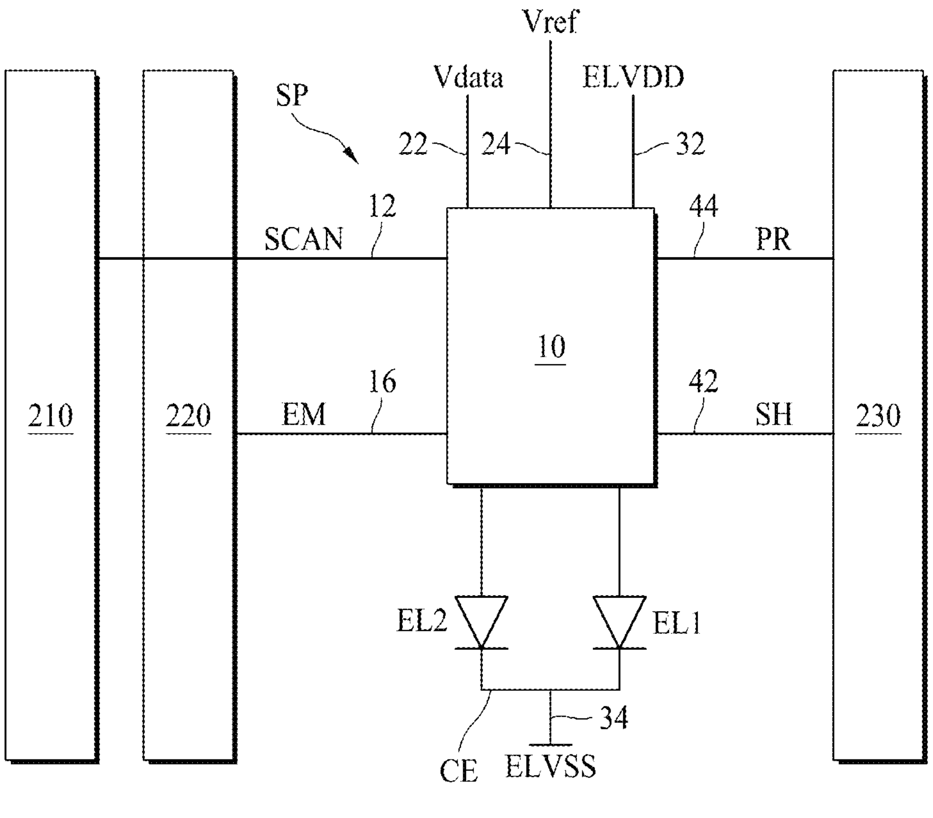
FIGS. 3A and 3B are diagrams schematically illustrating configurations of a sub-pixel and a gate driver according to one example embodiment of the present disclosure.
Figure 3B:
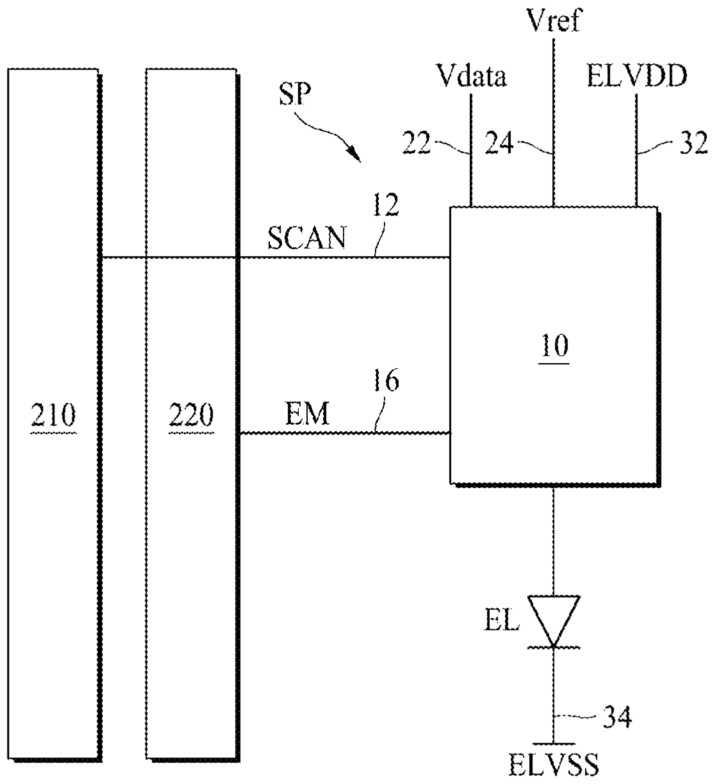
Figure 4:
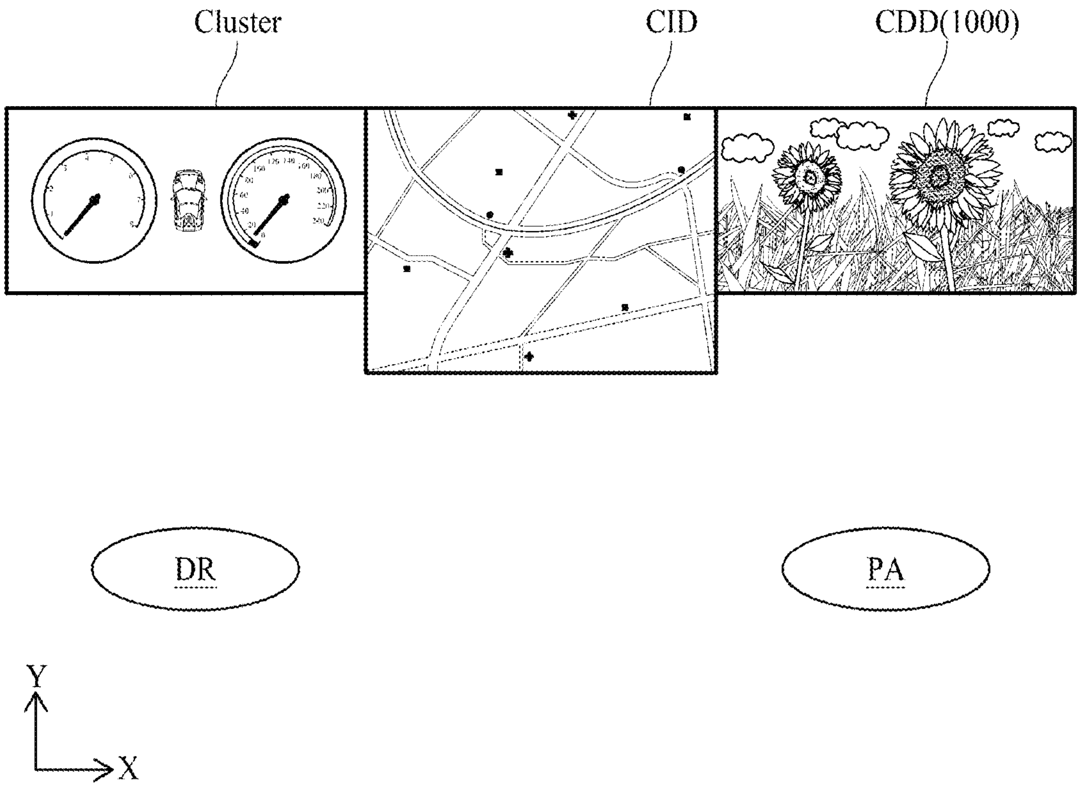
FIG. 4 is an illustration of an automotive display apparatus to which a display apparatus according to one example embodiment of the present disclosure is applied.

FIG. 1 is a block diagram schematically illustrating a configuration of a display apparatus, according to one example embodiment of the present disclosure, FIG. 2 is a schematic cross-sectional view of a display panel structure according to one example embodiment of the present disclosure, FIGS. 3A and 3B are diagrams schematically illustrating configurations of a sub-pixel and a gate driver according to one example embodiment of the present disclosure, and FIG. 4 is an illustration of an automotive display apparatus to which a display apparatus according to one example embodiment of the present disclosure is applied.

The display apparatus 1000, according to one example embodiment, may be an Electroluminescence display, including an organic light emitting diode (OLED) display device, a quantum-dot light emitting diode (QDED) display device, an inorganic light emitting diode (ILED) display device, or a micro light emitting diode (micro-LED) display device, without being limited thereto.

Referring to FIG. 1, a display apparatus 1000 may include a display panel 100, a display driver 900. The display driver 900 may be connected with a host system 2000.

The display driver 900 may include a gate driver 200, a data driver 300, a timing controller 400, a memory 500, a sensing circuit 600, and a power management circuit 700. The gate driver 200, the data driver 300, and the timing controller 400 may be represented as drivers. Embodiments are not limited thereto. As an example, at least one of the above-mentioned components may be omitted, or one or more additional components may be further included.

The display panel 100 can be a rigid display panel or a flexible display panel that can be deformed, such as a foldable, bendable, rollable, or stretchable display panel.

The display panel 100 may include a display area DA that displays an image, and bezel areas BZ: BZ1 through BZ4 that surround the display area DA and are disposed on the periphery of the display area DA. At least one of the bezel areas BZ1 through BZ4 may be omitted or at least partially not visible from the front side of the display panel 100. As an example, at least one of the bezel areas BZ1 through BZ4 may be omitted or at least partially not visible from a front side of the display panel 100 by being bent toward a rear side of the display panel 100, without being limited thereto.

The display panel 100, according to one example embodiment, may further include a touch sensor array disposed in the display area DA to sense a user’s touch. The touch sensor array may be omitted depending on the design.

The display panel 100 may display an image using a display area DA in which a plurality of sub-pixels SP are disposed in a matrix form. The pixel matrix of the display area DA may include a plurality of pixel row lines including the plurality of sub-pixels SPs arranged in a first direction X and a plurality of pixel column lines including the plurality of sub-pixels SPs arranged in a second direction Y. Embodiments are not limited thereto. As an example, the pixel matrix of the display area DA may include a plurality of pixel lines including the plurality of sub-pixels SPs arranged in a direction other than the first direction X and the second direction Y.

As an example, the sub-pixel SP may be any one of a red sub-pixel emitting red light, a green sub-pixel emitting green light, and a blue sub-pixel emitting blue light, without being limited thereto. As an example, the sub-pixel SP may be also a white sub-pixel emitting white light. The unit pixel may include at least two (e.g., two, three, four or more) sub-pixels SP. Embodiments are not limited thereto. As an example, the sub-pixel SP of other colors such as magenta, cyan, or yellow may be alternatively or additionally included, without being limited thereto.

As an example, the display panel 100 according to one example embodiment may be capable of controlling a viewing angle according to a viewing angle mode. As an example, the display area DA of the display panel 100 may display an image in a first viewing angle mode having a relatively wide viewing angle for the first direction X, or in a second viewing angle mode having a narrower viewing angle for the first direction X than the first viewing angle mode. The first viewing angle mode may be represented as a wide viewing angle mode or a share mode. The second viewing angle mode may be represented as a narrow viewing angle mode or a privacy mode. The display area DA of the display panel 100 may be operated in a Switchable Privacy Mode SPM capable of switching between the share mode and the privacy mode.

Referring to FIG. 2, a display panel 100 according to one example embodiment may include a pixel array 140 including a circuit element layer 120, and an encapsulation layer 150. The circuit element layer 120 includes a plurality of transistors and a plurality of signal lines or the like disposed on the substrate 110, the pixel array 140 further includes an emitting element layer 130 including a plurality of light emitting elements EL1, EL2 disposed on the circuit element layer 120, the encapsulation layer 150 is disposed to seal the emitting element layer 130 of the pixel array 140. The display panel 100 may include a touch sensor array 160 including a plurality of touch electrodes disposed on the encapsulation layer 150, and a light control array 170 including a plurality of light control elements L1, L2 disposed on the touch sensor array 160. The display panel 100 may further include a cover substrate 190 bonded by an optical clear adhesive OCA 180 over the light control array 170. The display panel 100, according to one example embodiment, may further include a color filter array including a color filter and a black matrix disposed between the touch sensor array 160 and the light control array 170. Embodiments are not limited thereto. As an example, at least one of the above-mentioned components (e.g., the touch sensor array 160, the optical clear adhesive OCA 180, the color filter array, the black matrix, etc.) may be omitted depending on the design. As an example, when the touch sensor array 160 is omitted, the light control array 170 may be disposed on the encapsulation layer 150, without being limited thereto.

Referring to FIGS. 2 and 3A, a sub-pixel SP according to one example embodiment capable of controlling a viewing angle includes a first emitting element EL1, a second emitting element EL2, and a pixel circuit 10. As an example, the pixel circuit drives the first emitting elements EL1 and the second emitting elements EL2 in a time-division manner according to the viewing angle mode, without being limited thereto. As an example, a first light control element L1 (FIG. 2) may overlap the first emitting element EL1, and a second light control element L1 (FIG. 2) may overlap the second emitting element EL2, without being limited thereto.

The sub-pixel SP according to one example embodiment may drive the first emitting element EL1 in the first viewing angle mode and emit light having a first viewing angle through the first light control element L1. The sub-pixel SP may drive the second emitting element EL2 in the second viewing angle mode and emit light having a second viewing angle narrower than the first viewing angle through the second light control element L2. Embodiments are not limited thereto. As an example, the sub-pixel SP according to one example embodiment may drive both of the first emitting element EL1 and the second emitting element EL2 in the first viewing angle mode, without being limited thereto.

Referring to FIGS. 1 and 3A, the sub-pixel SP according to one example embodiment may be supplied with a data voltage Vdata from the data driver 300 through at least one data line 22. The sub-pixel SP may be supplied with a scan signal SCAN through at least one gate line 12 from the gate driver 200, and may be supplied with an emission control signal EM through at least one gate line 16. The sub-pixel SP may be supplied with a first mode signal SH through the at least one gate line 42, and may be supplied with a second mode signal PR through the at least one gate line 44, from the gate driver 200. The sub-pixel SP according to an example embodiment may be supplied with a high potential power voltage ELVDD through the first power line 32, may be supplied with a low potential power voltage ELVSS through the common electrode (cathode electrode) CE and the second power line 34, and may be supplied with a reference voltage Vref through the reference line 24, from the power management circuit 700.

As an example, the gate driver 200 may be disposed in the bezel area BZ of the display panel 100, or may be distributed in the display area DA. The gate driver 200 according to one example embodiment may be embedded in a Gate In Panel (GIP) type, which is, for example, composed of transistors formed in the same process as the transistors in the display area DA, without being limited thereto. The gate driver 200 according to one example embodiment may be disposed in any one of the first and second bezel areas BZ1, BZ2 facing each other with the display area DA interposed therebetween, or may be disposed on both of the first and second bezel areas BZ1, BZ2. Embodiments are not limited thereto. As an example, the gate driver 200 may be separately disposed in a separate panel and connected to the display panel 100, for example, in a tape automated bonding (TAB) method, a chip on glass (COG) method, a chip on panel (COP) method, or a chip on film (COF) method, without being limited thereto.

The gate driver 200 may include at least one scan driver 210 driving at least one gate line 12, and at least one emitting control driver 220 driving at least one gate line 16. The number of gate lines connected to the sub-pixel SP, the number of scan drivers 210, and the number of emitting control drivers 220 may be varied depending on the detailed configuration of the pixel circuit included in the sub-pixel SP.

The gate driver 200 may be supplied with a plurality of gate control signals from the timing controller 400 to operate. In one example embodiment, the gate driver 200 may be applied with a plurality of gate control signals from the timing controller 400, for example, through a level shifter.

The scan driver 210 may supply at least one scan signal SCAN to at least one gate line 12 disposed on each of the plurality of pixel row lines using a plurality of first gate control signals.

The emitting control driver 220 may supply at least one emission control signal EM to at least one gate line 16 disposed on each of the plurality of pixel row lines using a plurality of second gate control signals.

In one example embodiment, the gate driver 200 may further include a mode control unit 230 that supplies mode signals SH, PR to the gate lines 42, 44.

The mode control unit 230 may supply the first mode signal SH through one of the gate lines 42 and the second mode signal PR through one of the gate lines 44 to each of the plurality of pixel row lines using a mode selection signal supplied from the timing controller 400. The mode control unit 230 may selectively drive the first emitting element EL1 and the second emitting element EL2 of each sub-pixel SP using the first mode signal SH and the second mode signal PR.

In one example embodiment, the first and second mode signals SH, PR may be supplied from the emitting control driver 220. In this case, the mode control unit 230 may be omitted, without being limited thereto. Although it is illustrated that the scan driver 210 and the emitting control driver 220 are located on a left side of the pixel circuit 10, and the mode control unit 230 is located on a right side of the pixel circuit 10, embodiments are not limited thereto. As an example, each of the scan driver 210, the emitting control driver 220 and the mode control unit 230 may be located on any side of the pixel circuit 10. As an example, the scan driver 210, the emitting control driver 220 and the mode control unit 230 may be located on the same side of different sides of the pixel circuit 10.

The plurality of transistors disposed in the display area DA of the display panel 100, and the bezel area BZ including the gate driver 200, may include at least one of an LTPS transistor utilizing a low temperature poly silicon (LTPS) semiconductor, an oxide transistor utilizing a metal-oxide semiconductor, and transistor utilizing other semiconductors such as a compound semiconductor, an organic semiconductor, a single crystal semiconductor, etc. As an example, the display panel 100 according to one example embodiment may be configured to coexist with LTPS transistors and oxide transistors to reduce power consumption, without being limited thereto.

The data driver 300 may be supplied with data control signals from the timing controller 400 to convert digital data into analog data signals to supply data voltages Vdata to the data lines 22 of the display panel 100. As an example, the data driver 300 may include a gamma voltage generating unit, and may convert the digital data to an analog data voltage using the gamma voltages supplied from the gamma voltage generating unit, without being limited thereto.

The data driver 300 may include at least one data drive IC (integrated circuit) that drives a plurality of data lines 22 disposed on the display panel 100. As an example, each data drive IC may be mounted on a respective circuit film and connected to the display panel 100, without being limited thereto. The circuit film on which the data drive ICs are mounted may be electrically connected to the display panel 100 via an anisotropic conductive film (ACF) bonded to a pad area disposed in the bezel area BZ3 of the display panel 100, without being limited thereto. The circuit film may be any one of chip on film (COF), flexible printed circuit (FPC), and flexible flat cable (FFC), without being limited thereto.

The timing controller 400 may be supplied with timing control signals and image data from the host system 2000.

The host system 2000 may be any one of a computer, a television system, a set-top box, a system on a mobile terminal such as a tablet or cell phone, or an automotive system, without being limited thereto.

The timing controller 400 may control operation of the gate driver 200 and the data driver 300 using timing control signals supplied from the host system 2000 and internally stored timing setting information. The timing controller 400 may generate gate control signals to control operation of the gate driver 200, and may generate data control signals to control operation of the data driver 300.

The timing controller 400 may perform various image processing, including image quality correction, afterimage compensation, luminance correction to reduce power consumption, and the like, using the image data supplied from the host system 2000, and may output the image data corrected by the image processing to the data driver 300, without being limited thereto.

The timing controller 400 according to one example embodiment may be supplied with results (sensing data) of sensing electrical characteristics of the display panel 100 from the sensing circuit 600 in a sensing mode, and may predict (calculate) changes in electrical characteristics due to deterioration of the emitting elements EL1, EL2 based on the sensing data. When the emitting elements EL1, EL2 are deteriorated (for example, by driving for a long time, without being limited thereto), the current density may decrease, which may increase the impedance, and the threshold voltage. The timing controller 400 may measure (predict) an impedance change corresponding to the amount of deterioration of the emitting elements EL1, EL2 by calculating a threshold voltage shift (shift value) of the emitting elements EL1, EL2 based on a sensing result of the display panel 100 supplied from the sensing circuit 600, without being limited thereto.

As an example, the timing controller 400 according to one example embodiment may accumulate image data, and determine a sensing area by predicting a deterioration area having a relatively large amount of deterioration in the display panel 100 based on the accumulated data, and may sense electrical characteristics for the determined sensing area through the sensing circuit 600 to calculate a change in electrical characteristics of the emitting elements EL1, EL2, without being limited thereto.

The timing controller 400, according to one example embodiment, may calculate the sensing data of each sub-pixel, for example, by scaling the sensing data for the sensing area including the plurality of sub-pixels for each sub-pixel, without being limited thereto.

The timing controller 400 according to one example embodiment may calculate an amount of change in the electrical characteristics of the emitting elements EL1, EL2 in the first sensing area (e.g., maximum deterioration area, without being limited thereto), for example, a threshold voltage shift, based on the difference between the sensing data in the first sensing area and the sensing data in a second sensing area (e.g., minimum deterioration area, without being limited thereto) different from the first sensing area.

The timing controller 400 according to one example embodiment may sense a change in electrical characteristics of the first emitting element EL1 through a sensing operation of the first viewing angle mode in the sensing mode, and may sense a change in electrical characteristics of the second emitting element EL2 through a sensing operation of the second viewing angle mode in the sensing mode.

The timing controller 400 may calculate and store in the memory 500 first and second compensation gains (luminance gains) to compensate for the deterioration of the first and second emitting elements EL1, EL2 based on the amount of change in the electrical characteristics of each of the first and second emitting elements EL1, EL2.

The timing controller 400 may compensate and output the image data by selectively utilizing the first and second compensation gains stored in the memory 500 for each viewing angle mode to compensate for afterimages due to deterioration of the first and second emitting elements EL1, EL2 respectively for each viewing angle mode.

The sensing circuit 600 may sense electrical characteristics of the sensing area of the display panel 100 as a voltage output through the second power line 34 in a sensing mode under control of the timing controller 400, and may convert the sensing voltage into sensing data and transmit it to the timing controller 400.

As an example, the sensing circuit 600, according to one example embodiment, may sense the sensing area a plurality of times and determine a median (average value) for the generated plurality of sensing data as the final sensing data and transmit it to the timing controller 400. Embodiments are not limited thereto. As an example, the sensing circuit 600 may determine a maximum value (or greatest value), a minimum value (or smallest value) or any value between the maximum value and minimum value for the generated plurality of sensing data as the final sensing data. As an example, the sensing circuit 600 may sense the sensing area only once. As an example, the sensing circuit 600 may sense more than one sensing areas, without being limited thereto.

The sensing circuit 600 according to one example embodiment may sense electrical characteristics of the sensing area of the display panel 100 for each viewing angle mode and/or for each color, in the sensing mode as voltages output through the second power line 34.

As an example, the display apparatus 1000, according to one example embodiment, may apply a maximum (white) grayscale data voltage to a sensing sub-pixel to cause either of the emitting elements EL1, EL2 to emit, and may apply a minimum (black) grayscale data voltage to a non-sensing sub-pixel to cause the emitting elements EL1, EL2 not to emit, without being limited thereto.

Since the sensing circuit 600 according to one example embodiment senses electrical characteristics of the sensing sub-pixels by utilizing the common cathode electrode CE and the second power line 34, which are shared by the sensing sub-pixels and the non-sensing sub-pixels in the display panel 100, the sensing accuracy of the sensing sub-pixels may be affected by the black grayscale current flowing through the non-sensing sub-pixels, thereby deteriorating the sensing accuracy of the sensing sub-pixels. In one example embodiment, when the capacitance of each of the emitting elements EL1, EL2 decreases due to the division of the sub-pixel SP, the black grayscale current may increase due to the charging of the leakage current, thereby deteriorating the sensing accuracy of the electrical characteristics of the sensing sub-pixel.

To solve this problem, the display apparatus 1000 according to one example embodiment may apply a positive voltage as the low potential power voltage ELVSS to the display panel 100 in the sensing mode to reduce the black grayscale current of the non-sensing sub-pixel even though the capacitance of each of the emitting elements EL1, EL2 decreases due to the division of the sub-pixel SP.

Accordingly, the display apparatus 1000 according to one example embodiment may improve sensing accuracy of the electrical characteristics of the sensing sub-pixels by reducing or minimizing the influence of the black grayscale current of the non-sensing sub-pixels when sensing the electrical characteristics of the sensing sub-pixels through the second power line 34 in the sensing circuit 600, thereby improving the afterimage compensation performance.

The sensing mode of the display apparatus 1000 according to one example embodiment may be performed at the direction of the host system 2000, may be performed by a user request via the host system 2000, may be performed according to a sequence determined by the timing controller 400, or may be performed periodically or randomly.

The power management circuit (PMIC) 700 may utilize the input voltage to generate and supply a plurality of power voltages required for operation of the display driver 900. The power management circuit 700 may generate and supply the high potential power voltage ELVDD, the low potential power voltage ELVSS, and the reference voltage Vref, etc., to the display panel 100, without being limited thereto.

The power management circuit 700 according to one example embodiment may be supplied with a set value of the low potential power voltage ELVSS that varies for each mode and/or for each color, for example, from the timing controller 400, without being limited thereto. The power management circuit 700 according to one example embodiment may be supplied with a set value of a different high potential power voltage ELVDD for each of the display mode and the sensing mode.

The power management circuit 700, according to one example embodiment, in the sensing mode, may generate and apply the high potential power voltage ELVDD and/or low potential power voltage ELVSS, which is differently set from in the display mode to the display panel 100.

In one example embodiment, a second low potential power voltage ELVSS of the sensing mode may be set to a voltage (e.g., a positive voltage) higher than a first low potential power voltage ELVSS of the display mode.

The power management circuit 700, in accordance with one example embodiment, may generate and apply the low potential power voltage ELVSS set differently for each mode and/or each color to the display panel 100 in each sensing period of the viewing angle mode during the sensing mode under the control of the timing controller 400.

As such, the display apparatus 1000 according to one example embodiment applies the positive low potential power voltage ELVSS to the display panel 100 in sensing mode, thus reduces or minimizes the zero term of the black grayscale current of the non-sensing sub-pixels, thereby improving afterimage compensation performance.

In a display apparatus according to one example embodiment, the sensing method utilizing a positive voltage as the low potential power voltage ELVSS in a sensing mode may also be applied to a display apparatus in which the emitting element EL of each sub-pixel SP is not divided, as shown in FIG. 3B. Referring to FIG. 3B, a sub-pixel SP of a display apparatus according to one example embodiment may include the pixel circuit 10 and the emitting element EL, and may be connected with the scan driver 210 and the emitting control driver 220.

The display apparatus according to one example embodiment may apply the positive low potential power voltage ELVSS to the display panel 100 in the sensing mode regardless of the time-division driving of the sub-pixels SP to reduce or minimize the black grayscale current in the non-sensing sub-pixels, thereby improving the sensing accuracy of the electrical characteristics of the sensing sub-pixels using the second power line 34, and improving the afterimage compensation performance.

FIG. 4 is an illustration of an automotive display apparatus to which a display apparatus according to one example embodiment of the present disclosure is applied.

Referring to FIG. 4, a plurality of display apparatus disposed on a dashboard of an automotive may include a cluster Cluster, a center information display CID, and a co-driver display CDD. In the Cluster and the Center Information Display CID, which are primarily used by the driver DR, conventional display apparatus may be applied. In the co-driver display CDD utilized by the driver DR and the passenger PA, as in one example embodiment described above, a display apparatus 1000 capable of controlling a viewing angle in the first viewing angle mode and the second viewing angle mode may be applied. Embodiments are not limited thereto. As an example, the display apparatus 1000 capable of controlling a viewing angle in the first viewing angle mode and the second viewing angle mode may be also applied in at least one of the Cluster and the Center Information Display CID.

The co-driver display apparatus CDD, 1000 may be operated in the first viewing angle mode under control of the host system 2000 (for example, when the driver DR is not driving, or even when the driver DR is driving), and may provide the driver DR and passenger PA with an image having a wide field of view in the first direction X.

The co-driver display apparatus CDD may be operated in the second viewing angle mode under control of the host system 2000 (for example, when the driver DR is driving or even when the driver DR is not driving), and may limit the viewing angle in the first direction X to provide a video having a narrow field of view to the passenger PA only, and may not provide the video to the driver DR, for example, so as not to interfere with driving.

The display apparatus 1000 according to one example embodiment may be applied to a variety of display devices, such as co-driver display devices CDDs, as well as mobile displays, IT displays, and TV displays, where viewing angle control is optionally required.

Figure 5:
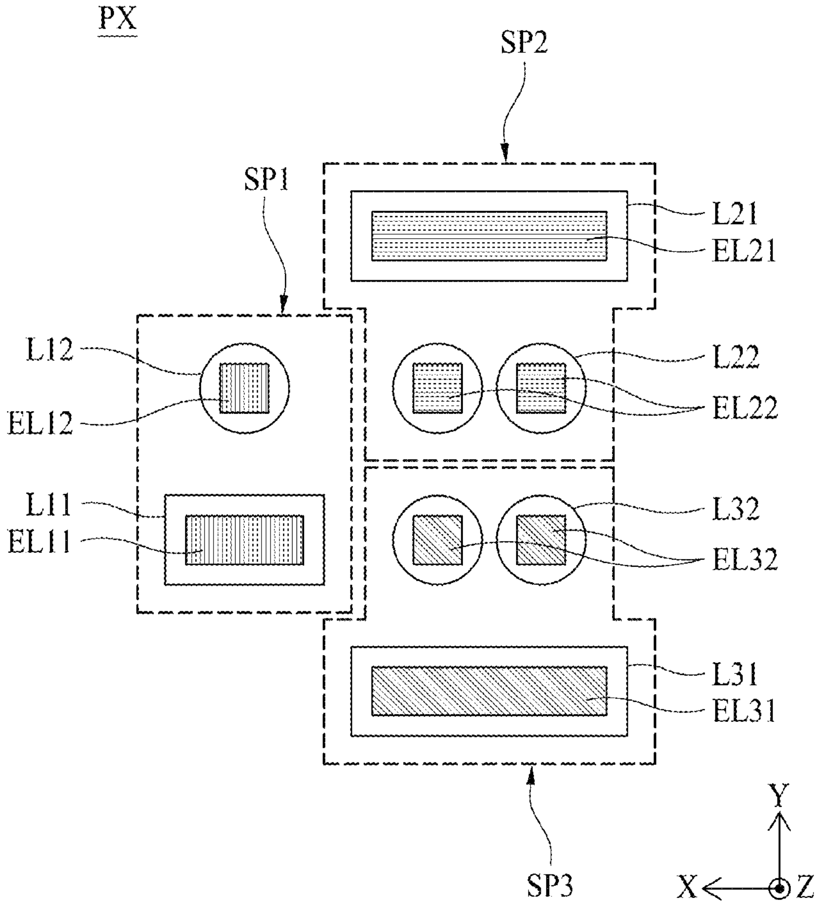
FIG. 5 is a schematic illustration of a pixel structure in a display panel, according to one example embodiment of the present disclosure.
Figure 6A:
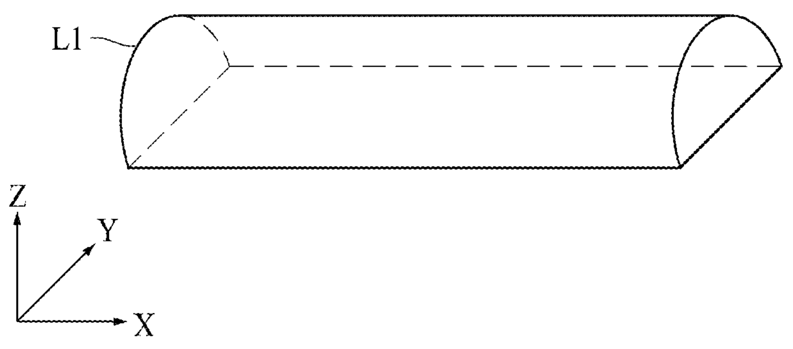
FIGS. 6A and 6B are illustrative drawings of structures of first and second light control elements, according to one example embodiment of the present disclosure.
Figure 6B:
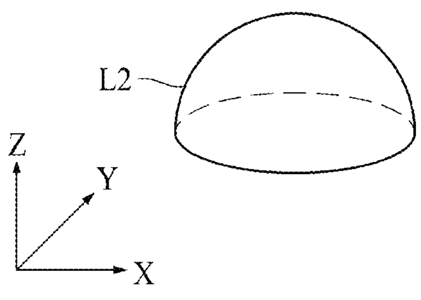

FIG. 5 is a schematic illustration of a pixel structure in a display panel, according to one example embodiment of the present disclosure, and FIGS. 6A and 6B are illustrative drawings of structures of first and second light control elements, according to one example embodiment of the present disclosure.

Referring to FIG. 5, in a display panel according to one example embodiment, each pixel PX may include the first, second, and third sub-pixels SP1, SP2, SP3. Embodiments are not limited thereto. As an example, each pixel PX may include two sub-pixels or more than three sub-pixels.

The first sub-pixel SP1 may include the first emitting element EL11, the first light control element L11 disposed to overlap on the first emitting element EL11, the second emitting element EL12, and the second light control element L12 disposed to overlap on the second emitting element EL12. The first sub-pixel SP1 may be a red sub-pixel having the first and second emitting elements EL11, EL12 emitting red light.

The second sub-pixel SP2 may include the first emitting element EL21, the first light control element L21 disposed to overlap on the first emitting element EL21, the second emitting element EL22, and the second light control element L22 disposed to overlap on the second emitting element EL22. The second emitting element EL22 may include one light emitting area or a plurality of (e.g., two, without being limited thereto) light emitting areas separated, for example, by the bank layer, and the plurality of second light control elements L22 may be disposed on the plurality of light emitting areas of the second emitting element EL22, respectively. The second sub-pixel SP2 may be a green sub-pixel having the first and second emitting elements EL21, EL22 emitting green light.

The third sub-pixel SP3 may include the first emitting element EL31, the first light control element L31 disposed to overlap on the first emitting element EL31, the second emitting element EL32, and the second light control element L32 disposed to overlap on the second emitting element EL32. The second emitting element EL32 may include one light emitting area or the plurality of (e.g., two, without being limited thereto) light emitting areas separated, for example, by the bank layer, and the plurality of second light control elements L32 may be disposed on the plurality of light emitting regions of the second emitting element EL32, respectively. The third sub-pixel SP3 may be a blue sub-pixel having the first and second emitting elements EL31, EL32 emitting blue light.

The size of the first emitting element EL11, EL21, EL31 may be larger than the size of the second emitting element EL12, EL22, EL32. The size of the lower surface of the first light control element L11, L21, L31 may be set larger than the size of the first emitting element EL11, EL21, EL31 (the size of the light emitting area) to improve the emission efficiency of light. The size of the lower surface of the second light control element L12, L22, L32 is set larger than the size of the second emitting element EL12, EL22, EL32 (the size of the light emitting area) to improve the emission efficiency of light.

In one example embodiment, the sizes of the first emitting elements EL11, EL21, EL31 may vary for each color to compensate for variations in light emission efficiency for each color of the first emitting elements EL11, EL21, EL31. In one example embodiment, the size of the first emitting element EL11 and the first light control element L11 of the first sub-pixel SP1 may be the smallest, and the size of the first emitting element EL21 and the second light control element L21 of the second sub-pixel SP2 may be equal to or smaller than the size of the first emitting element EL31 and the first light control element L31 of the third sub-pixel SP3. Embodiments are not limited thereto. As an example, the sizes of the first emitting elements EL11, EL21, EL31 may be the same for each color.

In one example embodiment, the size of the second emitting elements EL12, EL22, EL32 may vary for each color, or the number of light emitting areas of the same size may vary for each color, to compensate for variations in light emission efficiency for each color of the second emitting elements EL12, EL22, EL32. In one example embodiment, the size (number) of the second emitting element EL12 and the second light control element L12 of the first sub-pixel SP1 may be the smallest, and the size (number) of the second emitting element EL22 and the second light control element L22 of the second sub-pixel SP2 may be equal to or smaller than the size (number) of the second emitting element EL32 and the second light control element L33 of the third sub-pixel SP3. Embodiments are not limited thereto. As an example, the size of the second emitting elements EL12, EL22, EL32 may be the same for each color, or the number of light emitting areas of the same size may be the same for each color.

Referring to FIG. 6A, the first light control element (L1: L11, L21, L31) may have a half-cylindrical lens structure extended in the first direction X, and is not limited to this lens structure. Referring to FIG. 6B, the second light control element (L2: L12, L22, L32) may have a half-spherical lens structure, and is not limited to this lens structure. In one example embodiment, the first light control element (L11, L21, L31, L1) and the second light control element (L12, L22, L32, L2) may control (limit) the viewing angle in the first direction X differently and control (limit) the viewing angle in the second direction Y identically. Embodiments are not limited thereto. As an example, the first light control element (L1: L11, L21, L31) may be omitted depending on the design. As an example, the second light control element (L2: L12, L22, L32) may have a half-cylindrical lens structure extended in the first direction Y. As an example, the viewing angle in the second direction Y may not be limited. As an example, the first light control element (L11, L21, L31, L1) may not control (limit) the viewing angle in the first direction X. As an example, the first light control element (L11, L21, L31, L1) and the second light control element (L12, L22, L32, L2) may control (limit) the viewing angle in the second direction Y. As an example, the first light control element (L11, L21, L31, L1) and the second light control element (L12, L22, L32, L2) may control (limit) the viewing angle in the second direction Y differently, without being limited thereto.

In FIGS. 6A and 6B, the first direction X may represent a left-and-right direction (horizontal direction) of the display panel 100, the second direction Y may represent an up-and-down direction (vertical direction) of the display panel 100, and a third direction Z may represent a front-and-back direction (thickness direction) of the display panel 100. Embodiments are not limited thereto. As an example, the first direction X may represent an up-and-down direction (vertical direction) of the display panel 100, and the second direction Y may represent a left-and-right direction (horizontal direction) of the display panel 100, without being limited thereto.

In the first viewing angle mode, the first, second, and third sub-pixels SP1, SP2, SP3 may drive the first emitting elements EL11, EL21, EL31 and provide light having a wide field of view by not restricting the progression path of light emitted from each of the first emitting elements EL11, EL21, EL31 through the first light control elements L11, L21, L31 to be within a certain angle in the first direction X.

In the second viewing angle mode, the first, second, and third sub-pixels SP1, SP2, SP3 may drive the second emitting elements EL12, EL22, EL32 and provide light having a narrow viewing angle by limiting the progression path of the light emitted from each of the second emitting elements EL12, EL22, EL32 through the second light control elements L12, L22, L32 to be within a certain angle in the first direction X.

The first light control element L1: L11, L21, L31 and the second light control element L2: L12, L22, L32 may be controlled in a narrow field of view by limiting the light progression path to be within a certain angle in the second direction Y. Accordingly, in one example embodiment, when the display apparatus 1000 is applied to an automobile as shown in FIG. 4, it is possible to reduce or prevent the image displayed on the display apparatus 1000 from being reflected by the front glass of the automobile and interfering with the driver's vision.

Figure 7:
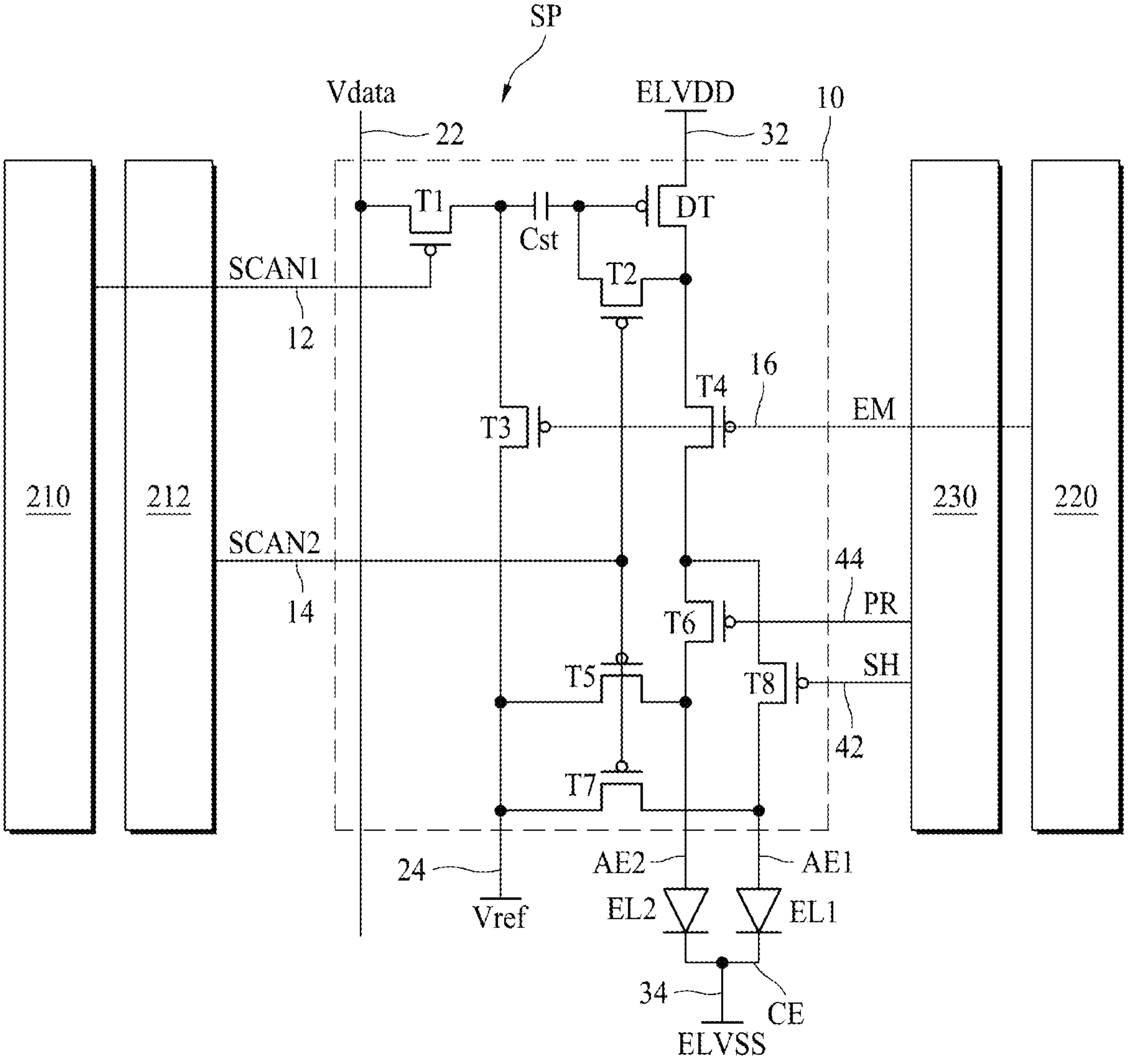
FIG. 7 is an equivalent circuit illustrating a sub-pixel configuration in a display panel, according to one example embodiment of the present disclosure.
Figure 8:
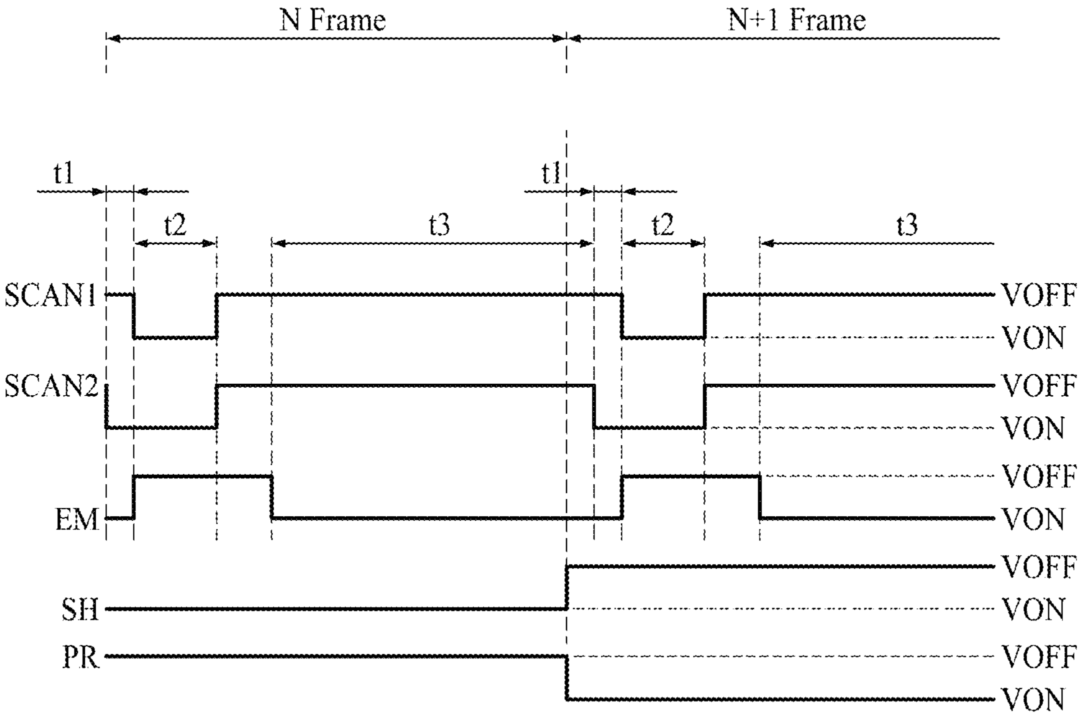
FIG. 8 is an illustration of a driving waveform of a sub-pixel, according to one example embodiment of the present disclosure.

FIG. 7 is an equivalent circuit illustrating a sub-pixel configuration in a display panel, according to one example embodiment, and FIG. 8 is an illustration of a driving waveform of a sub-pixel, according to one example embodiment.

Referring to FIG. 7, the sub-pixel SP may include the first and second emitting elements EL1, EL2, and the pixel circuit 10 driving the first and second emitting elements EL1, EL2 in a time-division manner. In one example embodiment, the pixel circuit 10 may include a driving transistor DT, a plurality of switching transistors T1 to T8, and a storage capacitor Cst, and is not limited to this configuration. As an example, more or less switching transistors and/or more or less storage capacitor may be included.

The pixel circuit 10 may be supplied with a first scan signal SCAN1 through a first gate line 12 from a first scan driver 210, and a second scan signal SCAN2 through a second gate line 14 from a second scan driver 212.

The pixel circuit 10 may be supplied with the emission control signal EM from the first emitting control driver 220 through the third gate line 16.

In one example embodiment, the pixel circuit 10 may be supplied with the first mode signal SH through the fourth gate line 42 from the mode control unit 230, and may be supplied with the second mode signal PR through the fifth gate line 44 from the mode control unit 230.

In one example embodiment, the pixel circuit 10 may be supplied with the first mode signal SH through the fourth gate line 42 from the first emitting control driver 220 or a second emitting control driver, and a second mode signal PR through the fifth gate line 44 from the first emitting control driver 220 or a second emitting control driver.

The pixel circuit 10 may be supplied with the data voltage Vdata from the data driver 300 (FIG. 1) through the data line 22. The pixel circuit 10 may be supplied with the high potential power voltage ELVDD through the first power line 32 from the power management circuit 700 (FIG. 1), the low potential power voltage ELVSS through the second power line 34 and the common electrode CE, and the reference voltage Vref through the reference line 24.

Referring to FIG. 8, the sub-pixel SP may be driven to include an Initial period t1, a Sampling and Writing period (t2), and an Emission period (t3) for each of the frame periods (N, N+1). For ease of description, in FIG. 8, N frame period represent any one frame period of the first viewing angle mode, and N+1 frame period represent any one frame period of the second viewing angle mode, without being limited thereto.

Each of the driving transistor DT and the plurality of switching transistors T1 to T8 of the pixel circuit 10 includes a gate electrode, a source electrode, and a drain electrode. Since the source electrode and the drain electrode are not fixed and may be changed according to the direction of the current and voltage applied to the gate electrode, one of the source electrode and the drain electrode may be represented as a first electrode and the other may be represented as a second electrode. The driving transistor DT and the plurality of switching transistors T1 to T8 of the pixel circuit 10 may utilize at least one of a polysilicon semiconductor, an amorphous silicon semiconductor, and an oxide semiconductor, or other semiconductors, and may be P-type or N-type, or may be a mixture of P-type and N-type.

The first and second emitting elements EL1, EL2 may be provided with anode electrodes AE1, AE2 individually connected to the eighth and sixth switching transistors T8, T6, a cathode electrode CE supplied with the low potential power voltage ELVSS from the second power line 34, and the light emitting layer between the anode electrodes AE1, AE2 and the cathode electrode CE. When the first and second emitting elements EL1, EL2 are supplied with a driving current from the driving transistor DT through the eighth and sixth switching transistors T8, T6, respectively, electrons from the cathode electrode CE are injected into the light emitting layer, and holes from the anode electrodes AE1, AE2 are injected into the light emitting layer, and the recombination of electrons and holes in the light emitting layer causes the fluorescent or phosphorescent material to emit light with a brightness, for example, proportional to the current value of the drive current.

The gate electrode of the driving transistor DT may be connected with the storage capacitor Cst, the first electrode may be connected with the first power line 32 supplying the high potential power voltage ELVDD, and the second electrode may be connected with the first electrode of the fourth switching transistor T4. The driving transistor DT may be connected in common with the first electrodes of the sixth and eighth switching transistors T6, T8 through the fourth switching transistor T4. The driving transistor DT may drive the first emitting element EL1 through the fourth and eighth switching transistors T4, T8, or may drive the second emitting element EL2 through the fourth and sixth switching transistors T4, T6. The driving transistor DT may control the emission intensity of the first emitting element EL1 through the fourth and eighth switching transistors T4, T8, or control the emission intensity of the second emitting element EL2 through the fourth and sixth switching transistors T4, T6, by controlling the driving current according to the driving voltage charged in the storage capacitor Cst.

The storage capacitor Cst may be connected between the second electrode of the first switching transistor T1 and the gate electrode of the driving transistor DT to charge a driving voltage corresponding to the data voltage Vdata. The storage capacitor Cst may hold the charged driving voltage during the emission period t3 in which the first switching transistor T1 is turned off, and supply it to the driving transistor DT.

The first switching transistor T1 may be turned on or turned off in response to the first scan signal SCAN1 on the first gate line 12 disposed on the i-th (i is a natural number) pixel row line. The first switching transistor T1 may supply a data voltage Vdata supplied through the data line 22 to the first electrode of the storage capacitor Cst during the sampling and writing period t2 in which the first scan signal SCAN1 has a gate-on voltage VON. The switching transistor T1 may be turned off during the initial period t1 and the emission period t3 in which the first scan signal SCAN1 has a gate-off voltage VOFF.

The second, fifth, and seventh switching transistors T2, T5, and T7 may be turned on or turned off in response to the second scan signal SCAN2 supplied to the second gate line 14 of the i-th pixel row line. The second, fifth, and seventh switching transistors T2, T5, and T7 may be turned on during the initial period t1 and the sampling and writing period t2 when the second scan signal SCAN2 has the gate-on voltage VON, and may be turned off during the emission period t3 when the second scan signal SCAN2 has the gate-off voltage VOFF.

The second switching transistor T2 may connect the driving transistor DT into a diode structure by connecting the gate electrode and the second electrode of the driving transistor DT in response to the second scan signal SCAN2 during the initial period t1 and the sampling and writing period t2. The second switching transistor T2 may compensate by charging the threshold voltage Vth of the driving transistor DT to the storage capacitor Cst. Accordingly, the storage capacitor Cst may charge a data voltage at which the threshold voltage Vth of the driving transistor DT is compensated.

The fifth switching transistor T5 may, in response to the second scan signal SCAN2, supply the reference voltage Vref supplied through the reference line 24 to the anode electrode AE2 of the second emitting element EL2 during the initial period t1 and the sampling and writing period t2.

The seventh switching transistor T7 may, in response to the second scan signal SCAN2, supply the reference voltage Vref supplied through the reference line 24 to the anode electrode AE1 of the first emitting element EL1 during the initial period t1 and the sampling and writing period t2.

The third and fourth switching transistors T3, T4 may be turned on or turned off in response to the emission control signal EM supplied to the third gate line 16 of the i-th pixel row line. The third and fourth switching transistors T3, T4 may be turned on during the initial period t1 and the emission period t3 in which the emission control signal EM has the gate on voltage VON, and may be turned off during a sampling and writing period t2 in which the emission control signal EM has the gate-off voltage VOFF, and during a period between the sampling and writing period t2 and the emission period t3.

The third switching transistor T3 may supply the reference voltage Vref supplied through the reference line 24 to the first electrode of the storage capacitor Cst during the initial period t1 and the emission period t3 in response to the emission control signal EM.

The fourth switching transistor T4 may connect the driving transistor DT with the sixth and eighth switching transistors T6, T8 during the initial period t1 and the emission period t3 in response to the emission control signal EM.

The eighth switching transistor T8 may be turned on or turned off in response to the first mode signal SH supplied to the fourth gate line 42 of the i-th pixel row line. The eighth switching transistor T8 may be turned on during a driving period (N frame) of the first viewing angle mode in which the first mode signal SH has the gate-on voltage VON, and may be turned off during a driving period (N+1 frame) of the second viewing angle mode in which the first mode signal SH has the gate-off voltage VOFF.

The eighth switching transistor T8 may connect the fourth switching transistor T4 with the first emitting element EL1 during the driving period (N frame) of the first viewing angle mode in response to the first mode signal SH.

During the emission period t3 of the driving period (N frame) of the first viewing angle mode, the driving transistor DT may drive the first emitting element EL1 through the fourth and eighth switching transistors T4, T8. Accordingly, the sub-pixel SP may provide light of the first viewing angle through the first emitting element EL1 and the first light control element L1 (FIG. 6A).

The sixth switching transistor T6 may be turned on or turned off in response to a second mode signal PR supplied to the fifth gate line 44 disposed on the i-th pixel row line. The sixth switching transistor T6 may be turned on during the driving period (N+1 frame) of the second viewing angle mode in which the second mode signal PR has the gate-on voltage VON, and may be turned off during the driving period (N frame) of the first viewing angle mode in which the second mode signal PR has the gate-off voltage VOFF.

The sixth switching transistor T6 may connect the fourth switching transistor T4 with the second emitting element EL2 during the driving period (N+1 frame) of the second viewing angle mode in response to the second mode signal PR.

During the emission period t3 of the driving period (N+1 frame) of the second viewing angle mode, the driving transistor DT may drive the second emitting element EL2 through the fourth and sixth switching transistors T4, T6. Accordingly, the sub-pixel SP may provide light of the second viewing angle through the second emitting element EL2 and the second light control element L2 (FIG. 6B). Although it is illustrated that the first mode signal SH and the second mode signal PR have the gate-on voltage VON in the respective driving period (the N frame or the N+1 frame), embodiments are not limited thereto. As an example, the first mode signal SH and the second mode signal PR may have the gate-on voltage VON during only the initial period t1 and the emission period t3 of the respective driving period, without being limited thereto. In addition, although it is illustrated that the gate-on voltage VON is a voltage lower than the gate-off voltage VOFF, embodiments are not limited thereto. As an example, the gate-on voltage VON may be a voltage higher than the gate-off voltage VOFF, depending on the type of the corresponding transistor.

Figure 9:
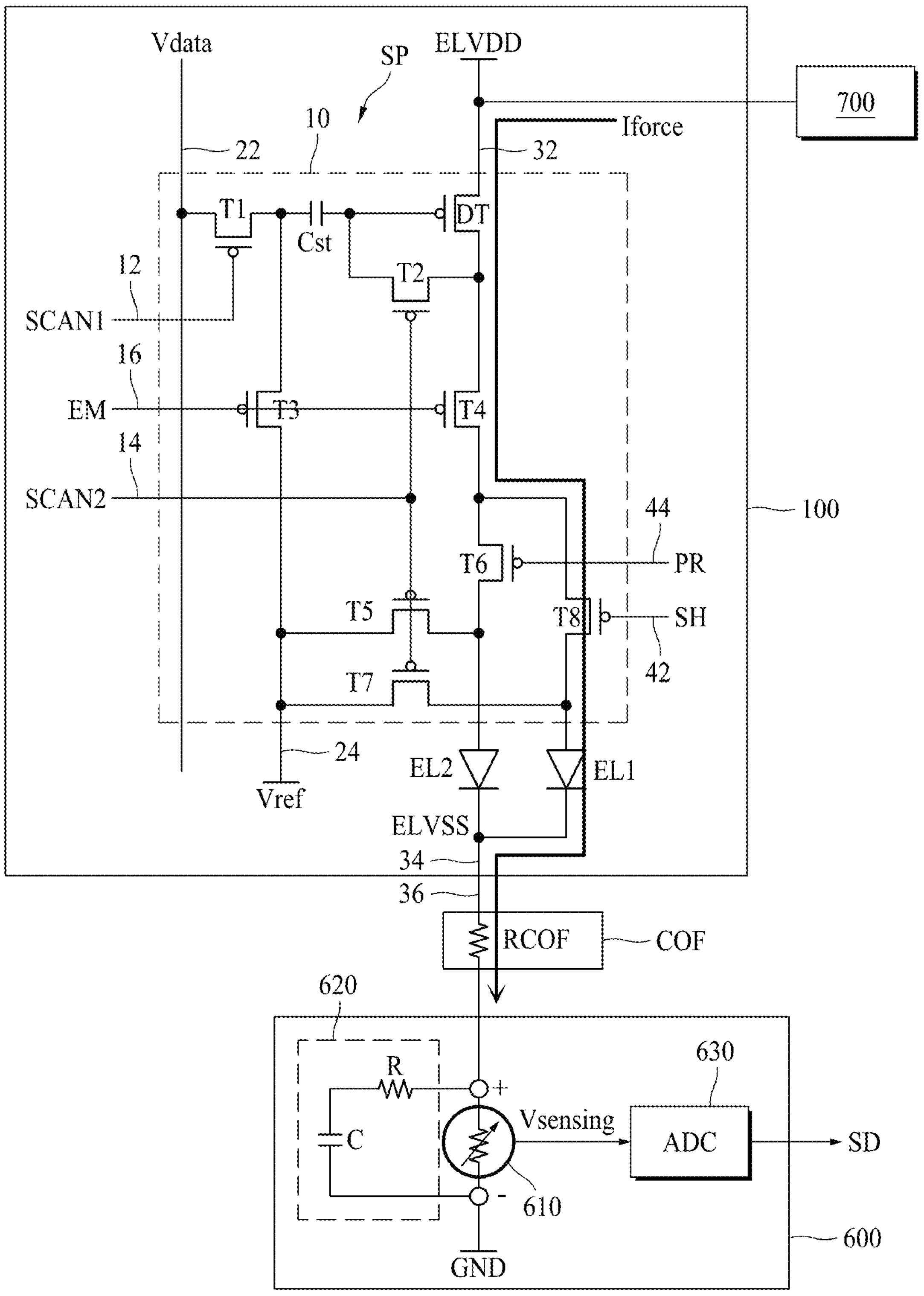
FIG. 9 is a diagram illustrating a sensing path of a first viewing angle mode of a sensing sub-pixel in a display apparatus, according to one example embodiment of the present disclosure.
Figure 10:
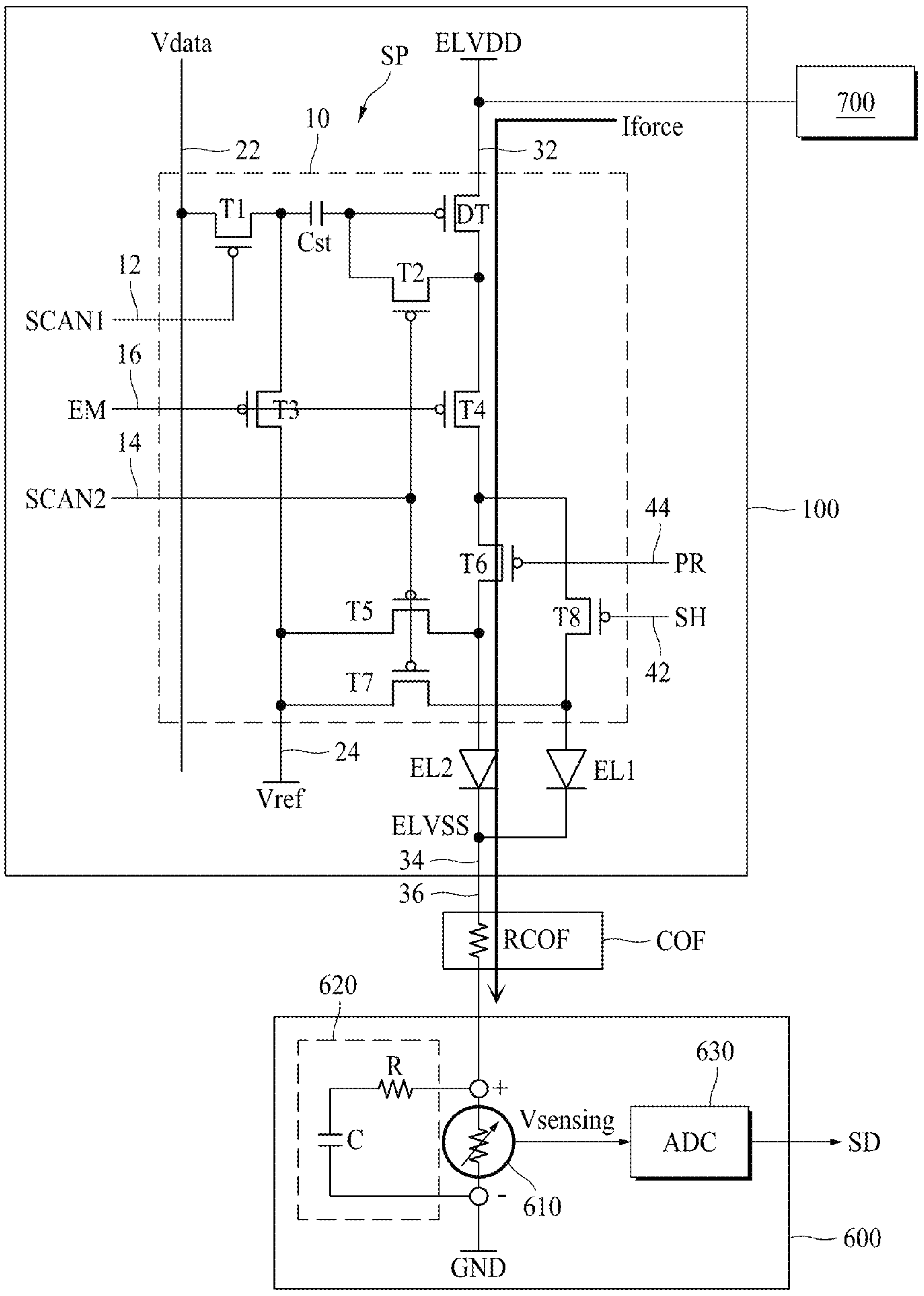
FIG. 10 is a diagram illustrating a sensing path of a second viewing angle mode of a sensing sub-pixel in a display apparatus according to one example embodiment of the present disclosure.

FIG. 9 is a diagram illustrating a sensing path of a first viewing angle mode of a sensing sub-pixel in a display apparatus, according to one example embodiment of the present disclosure, FIG. 10 is a diagram illustrating a sensing path of a second viewing angle mode of a sensing sub-pixel in a display apparatus according to one example embodiment of the present disclosure.

Referring to FIGS. 9 and 10, during the sensing mode, the power management circuit 700 may generate and apply the high potential power voltage ELVDD, the low potential power voltage ELVSS, and the reference voltage Vref for the sensing mode to the display panel 100, and may supply a set current Iforce through the first power line 32. The power management circuit 700 according to one example embodiment may generate the second low potential power voltage ELVSS for the sensing mode as a positive voltage higher than the first low potential power voltage for the display mode and apply it to the second power line 34 of the display panel 100.

The second power line 34 of the display panel 100 may be connected to the sensing circuit 600 via a second power supply line 36 through the circuit film COF. The second power supply line 36 may connect to the power management circuit 700 to supply the display panel 100 with the low potential power voltage ELVSS.

The sensing circuit 600 according to one example embodiment may sense a voltage Vsensing reflecting the electrical characteristics of the sensing sub-pixel SP by detecting a voltage at the end of the second power supply line 36 using the set current Iforce flowing through the sensing sub-pixel SP of the display panel 100, and may convert the sensing voltage Vsensing into sensing data SD and transmit it to the timing controller 400.

The sensing circuit 600, according to one example embodiment, may include a voltage sensing circuit 610, a low pass filter LPF 620, and an analog-to-digital converter ADC 630.

The voltage sensing circuit 610 may detect a voltage between the second power supply line 36 and the ground GND of the display panel 100 using the set current Iforce and output it as the sensing voltage Vsensing. In one example embodiment, the voltage sensing circuit 610 may include a current regulator, a level up/down circuit, a switching element, and the like, without being limited thereto.

The low pass filter 620 may include a resistor R and a capacitor C to block high frequency noise.

The ADC 630 may digitally convert the sensing voltage Vsening to sensing data SD and output it to the timing controller 400. Embodiments are not limited thereto. As an example, the sensing circuit 600 may directly output the sensing voltage Vsening to the timing controller 400. In this case, the ADC 630 may be omitted, without being limited thereto.

Referring to FIG. 9, the sub-pixels SP sensed by the display panel 100 may be driven using a driving waveform equal to the driving period (N frame) of the first viewing angle mode shown in FIG. 8.

Referring to FIGS. 8 and 9, the sensing sub-pixel SP is supplied with the data voltage Vdata in a white grayscale in the sampling and writing period t2 to charge the storage capacitor Cst with a driving voltage, and during the emission period t3, the driving transistor DT may light up the first emitting element EL1 through the fourth and eighth switching transistors T4, T8.

During the emission period t3, the set current Iforce may flow from the display panel 100 to the sensing circuit 600 through the first sensing path. The first sensing path is a path from the first power line 32 to the second power supply line 36 through the driving transistor DT of the sensing sub-pixel SP, the fourth and eighth switching transistors T4, T8, the first emitting element EL1, and the circuit film COF or the like.

By detecting the voltage between the second power supply line 36 and the ground GND using the set current Iforce of the first sensing path, the sensing circuit 600 may sense the electrical characteristics of the sensing sub-pixel SP reflecting the threshold voltage of the first emitting element EL1 as the sensing voltage Vsensing and convert it into sensing data SD.

The sensing voltage Vsensing sensed in the sensing circuit 600 may be a voltage reflecting all of the components of electrical characteristics included in the first sensing path such as the threshold voltage of the driving transistor DT, the threshold voltage of the fourth and eighth switching transistors T4, T8, the threshold voltage of the first emitting element EL1, and the voltage dropped by the wiring resistance RCOF of the circuit film COF, etc. For example, the sensing voltage Vsensing may be a voltage reflected by subtracting all of the voltage components of the first sensing path from the first power supply voltage ELVDD.

The timing controller 400, FIG. 1, according to one example embodiment, may calculate a first threshold voltage shift amount according to the deterioration of the first emitting element EL1 of the first sub-pixel SP by obtaining a difference between the first sensing data of the first sub-pixel SP sensed in a first area (e.g., the maximum deterioration area) and the second sensing data of the second sub-pixel SP sensed in a second area (e.g., the minimum deterioration area). Based on the first threshold voltage shift amount, the timing controller 400 according to one example embodiment may calculate a first compensation gain to compensate for the deterioration of the first emitting element EL1 and store it in the memory 500.

Referring to FIG. 10, the sub-pixels SP sensed by the display panel 100 may be driven using a driving waveform equal to the driving period (N+1 frame) of the second viewing angle mode shown in FIG. 8.

Referring to FIGS. 8 and 10, the sensing sub-pixel SP is supplied with the data voltage Vdata in a white grayscale in the sampling and writing period t2 to charge the storage capacitor Cst with a driving voltage, and during the emission period t3, the driving transistor DT may light up the second emitting element EL2 through the fourth and sixth switching transistors T4, T6.

During the emission period t3, the set current Iforce may flow from the display panel 100 to the sensing circuit 600 through the second sensing path. The second sensing path is a path from the first power line 32 to the second power supply line 36 through the driving transistor DT of the sensing sub-pixel SP, the fourth and sixth switching transistors T4, T6, the second emitting element EL2, the second power supply line 36, and the circuit film COF or the like.

By detecting the voltage between the second power supply line 36 and the ground GND using the set current Iforce supplied through the second sensing path, the sensing circuit 600 may sense the electrical characteristics of the sensing sub-pixel SP reflecting the threshold voltage of the second emitting element EL2 as the sensing voltage Vsensing and convert it into sensing data SD.

The sensing voltage Vsensing sensed in the sensing circuit 600 may be a voltage reflecting all of the components of electrical characteristics included in the second sensing path such as the threshold voltage of the driving transistor DT, the threshold voltage of the fourth and sixth switching transistors T4, T6, the threshold voltage of the second emitting element EL2, and the voltage dropped by the wiring resistance RCOF of the circuit film COF, etc. For example, the sensing voltage Vsensing may be a voltage reflected by subtracting all of the voltage components of the second sensing path from the first power supply voltage ELVDD.

The timing controller 400, FIG. 1, according to one example embodiment, may calculate a second threshold voltage shift amount according to the deterioration of the second emitting element EL2 of the first sub-pixel SP by obtaining a difference between the third sensing data of the first sub-pixel SP sensed in a first area (e.g., the maximum deterioration area) and the fourth sensing data of the second sub-pixel SP sensed in a second area (e.g., the minimum deterioration area). Based on the second threshold voltage shift amount, the timing controller 400 according to one example embodiment may calculate a second compensation gain to compensate for the deterioration of the second emitting element EL2 and store it in the memory 500. It should be noted that, the maximum deterioration area and the minimum deterioration area for the first emitting element EL1 may be identical to or different from the maximum deterioration area and the minimum deterioration area for the second emitting element EL2, without being limited thereto. As an example, the maximum deterioration area and/or the minimum deterioration area may be an area including one or more sub-pixels. As an example, the maximum deterioration area and/or the minimum deterioration area may have the same size or different sizes.

The display apparatus according to one example embodiment may apply the positive low potential power voltage ELVSS to the second power line 34 of the display panel 100 in the sensing mode to reduce the black grayscale current of the non-sensing sub-pixel, thereby reducing or minimizing the influence of the black grayscale current on the set current Iforce flowing through the second power line 34, to improve the sensing accuracy of the electrical characteristics of the emitting elements EL1, EL2 of the sensing sub-pixel SP.

Figure 11:
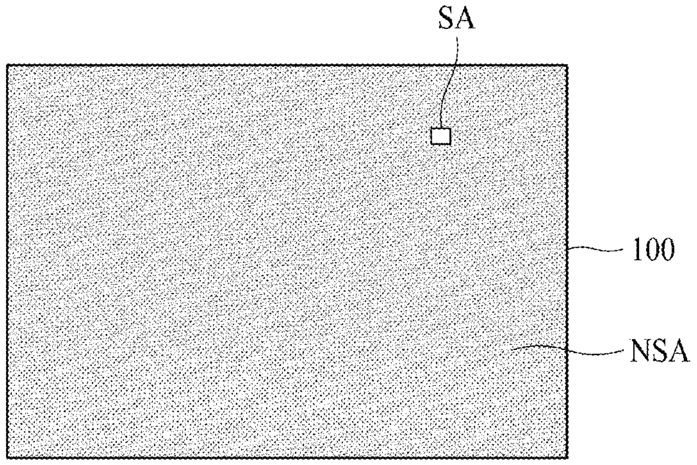
FIG. 11 is an illustration of a sensing area of a display apparatus, according to one example embodiment of the present disclosure.

FIG. 11 is an illustration of a sensing area of a display apparatus, according to one example embodiment of the present disclosure.

Referring to FIGS. 1 and 11, as an example, the timing controller 400 of the display apparatus 1000 according to one example embodiment may determine at least one sensing area SA that is predicted to be a maximum deterioration area in the display panel 100 using the accumulated results of the image data. The at least one sensing area SA may include a plurality of sub-pixels having similar deterioration characteristics.

The display apparatus 1000 according to one example embodiment may sense electrical characteristics of the sensing area SA of the display panel 100 in the sensing mode after the sensing area SA is emitting using a white grayscale data voltage, and the non-sensing area NSA may be non-emitting using a black grayscale data voltage.

The display apparatus 1000 according to one example embodiment may sequentially sense the sensing area SA of the display panel 100 by dividing it into first and second viewing angle modes, and/or may sequentially sense the sensing area SA in each of the first and second viewing angle modes by dividing it by color, without being limited thereto.

Figure 12A:
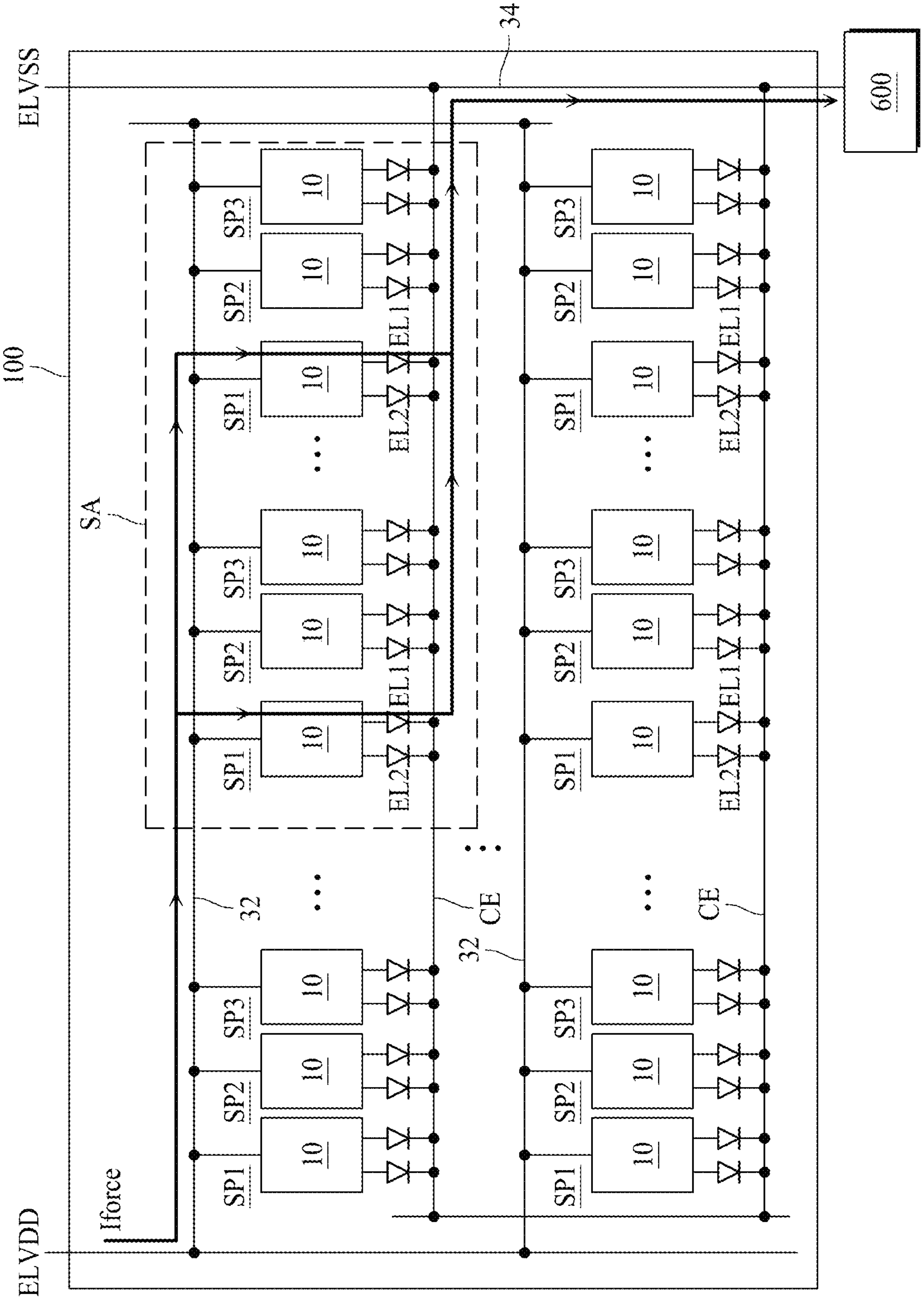
FIGS. 12A to 12C are diagrams illustrating a sensing path for each color of a first viewing angle mode of a sensing area in a display apparatus, according to one example embodiment of the present disclosure.
Figure 12B:
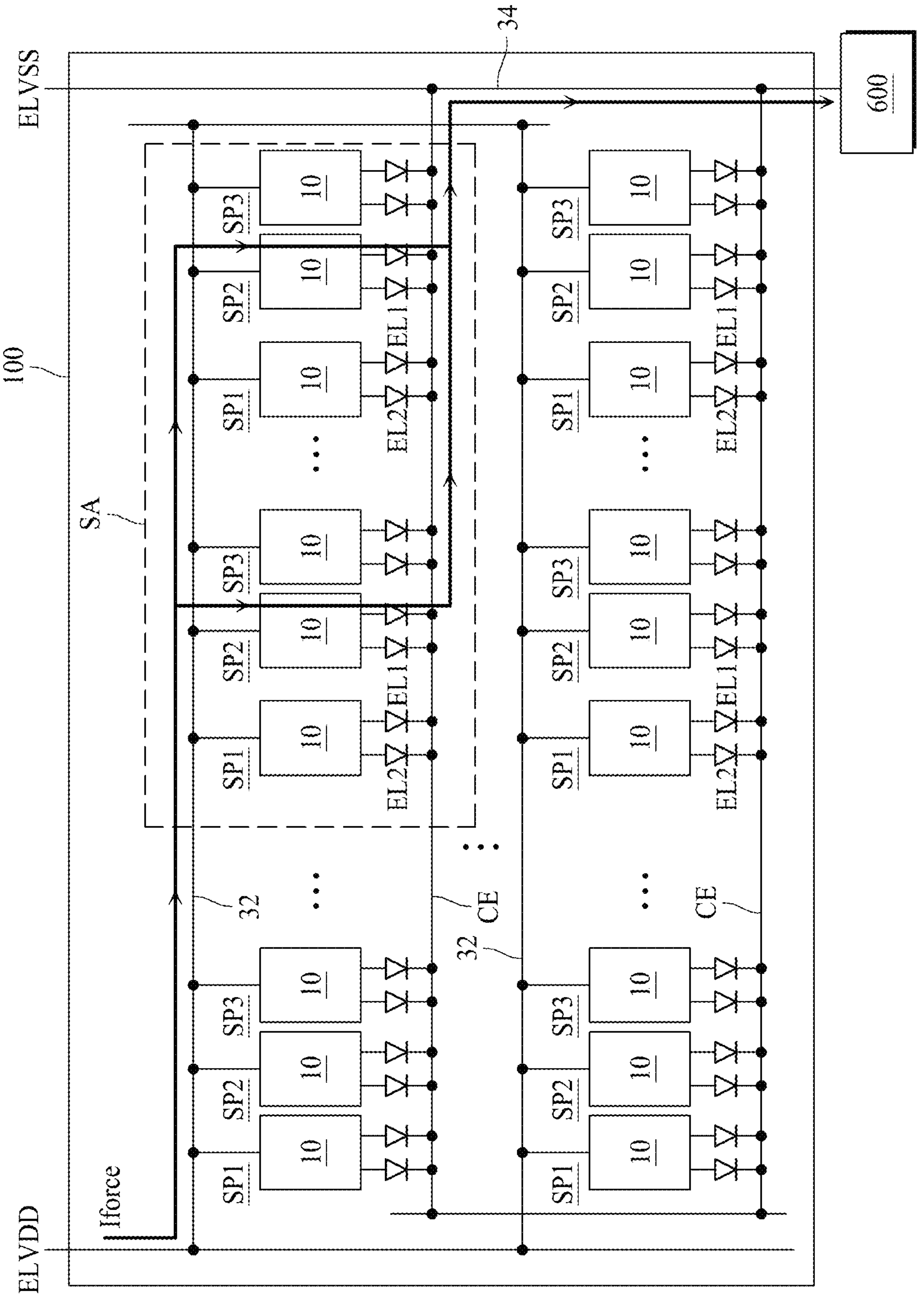
Figure 12C:
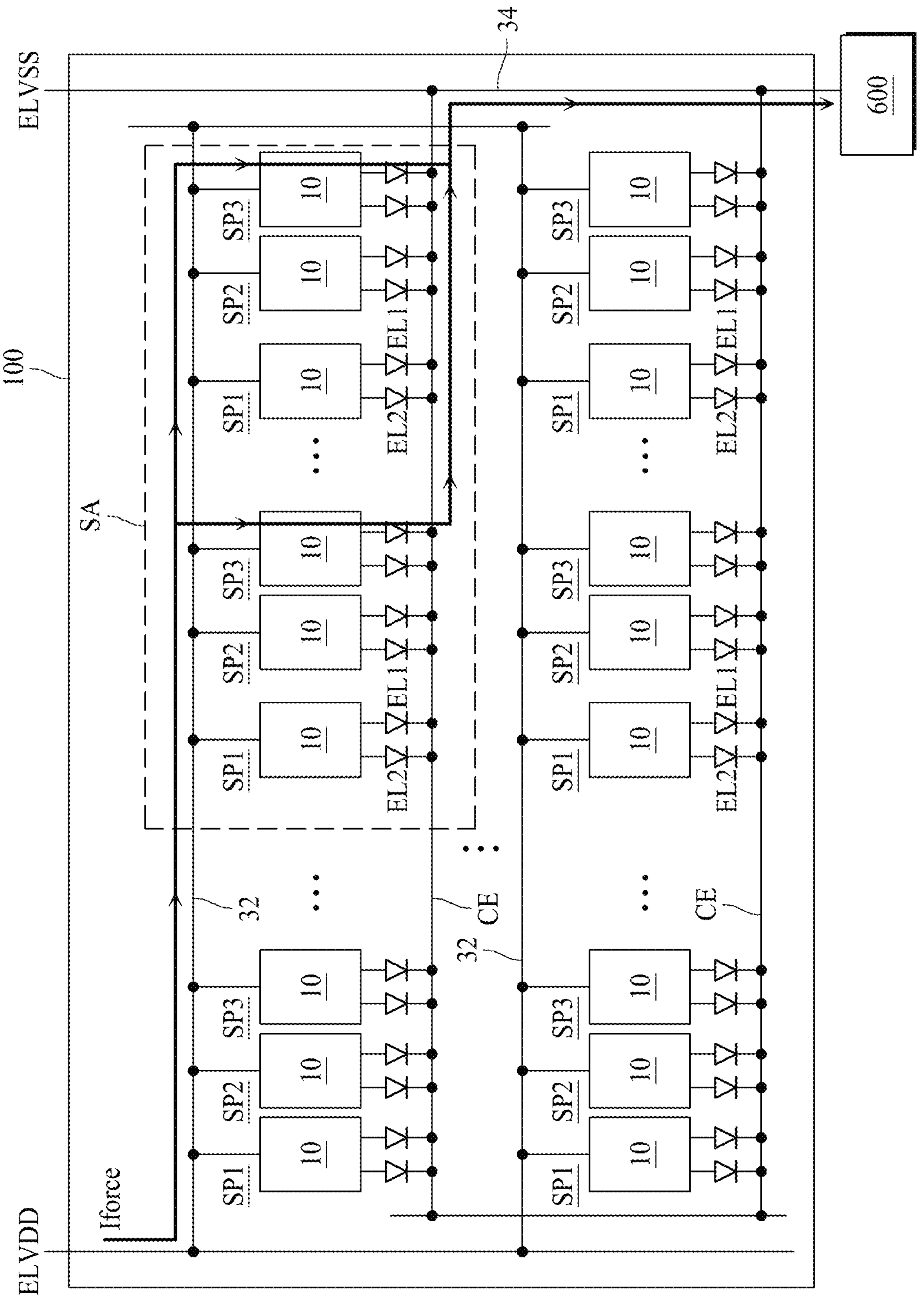

FIGS. 12A to 12C are diagrams illustrating a sensing path for each color of a first viewing angle mode of a sensing area in a display apparatus, according to one example embodiment of the present disclosure.

Referring to FIGS. 12A to 12C, the display apparatus according to one example embodiment may sense, using the sensing circuit 600, electrical characteristics of the first emitting elements EL1 of the first color sub-pixels SP1 of the sensing area SA in the first sensing period of the first viewing angle mode, electrical characteristics of the first emitting element EL1 of the second color sub-pixels SP2 in the second sensing period, and electrical characteristics of the first emitting element EL1 of the third color sub-pixels SP3 in the third sensing period. The display apparatus according to one example embodiment may apply the positive low potential power voltage ELVSS to the second power line 34 of the display panel 100 in the sensing period of the first viewing angle mode. As an example, the display apparatus according to one example embodiment may apply the positive low potential power voltage ELVSS different for each color to the second power line 34 of the display panel 100 in the first to third sensing period of the first viewing angle mode, without being limited thereto. As an example, the display apparatus according to one example embodiment may also apply the same positive low potential power voltage ELVSS for each color to the second power line 34 of the display panel 100 in the first to third sensing period of the first viewing angle mode.

Referring to FIG. 12A, the display apparatus according to one example embodiment may cause the first emitting element EL1 of the first sensing sub-pixels SP1 of the sensing area SA to emit in a white grayscale, and the non-sensing sub-pixels SP2, SP3 of the sensing area SA and the sub-pixels SP1, SP2, SP3 of the non-sensing area NSA to non-emit in a black grayscale. The sensing circuit 600 may sense electrical characteristics of the first emitting element EL1 of the first sensing sub-pixels SP1 using the set current Iforce flowing through the first emitting element EL1 of the first sensing sub-pixels SP1 and the common cathode electrode CE and the second power line 34.

Referring to FIG. 12B, the display apparatus according to one example embodiment may cause the first emitting element EL1 of the second sensing sub-pixels SP2 of the sensing area SA to emit in a white grayscale, and the non-sensing sub-pixels SP1, SP3 of the sensing area SA and the sub-pixels SP1, SP2, SP3 of the non-sensing area NSA to non-emit in a black grayscale. The sensing circuit 600 may sense electrical characteristics of the first emitting element EL1 of the second sensing sub-pixels SP2 using the set current Iforce flowing through the first emitting element EL1 of the second sensing sub-pixels SP2 and the common cathode electrode CE and the second power line 34.

Referring to FIG. 12C, the display apparatus according to one example embodiment may cause the first emitting element EL1 of the third sensing sub-pixels SP3 of the sensing area SA to emit in a white grayscale, and the non-sensing sub-pixels SP1, SP2 of the sensing area SA and the sub-pixels SP1, SP2, SP3 of the non-sensing area NSA to non-emit in a black grayscale. The sensing circuit 600 may sense electrical characteristics of the first emitting element EL1 of the third sensing sub-pixels SP3 using the set current Iforce flowing through the first emitting element EL1 of the third sensing sub-pixels SP3, the common cathode electrode CE, and the second power line 34.

Figure 13A:
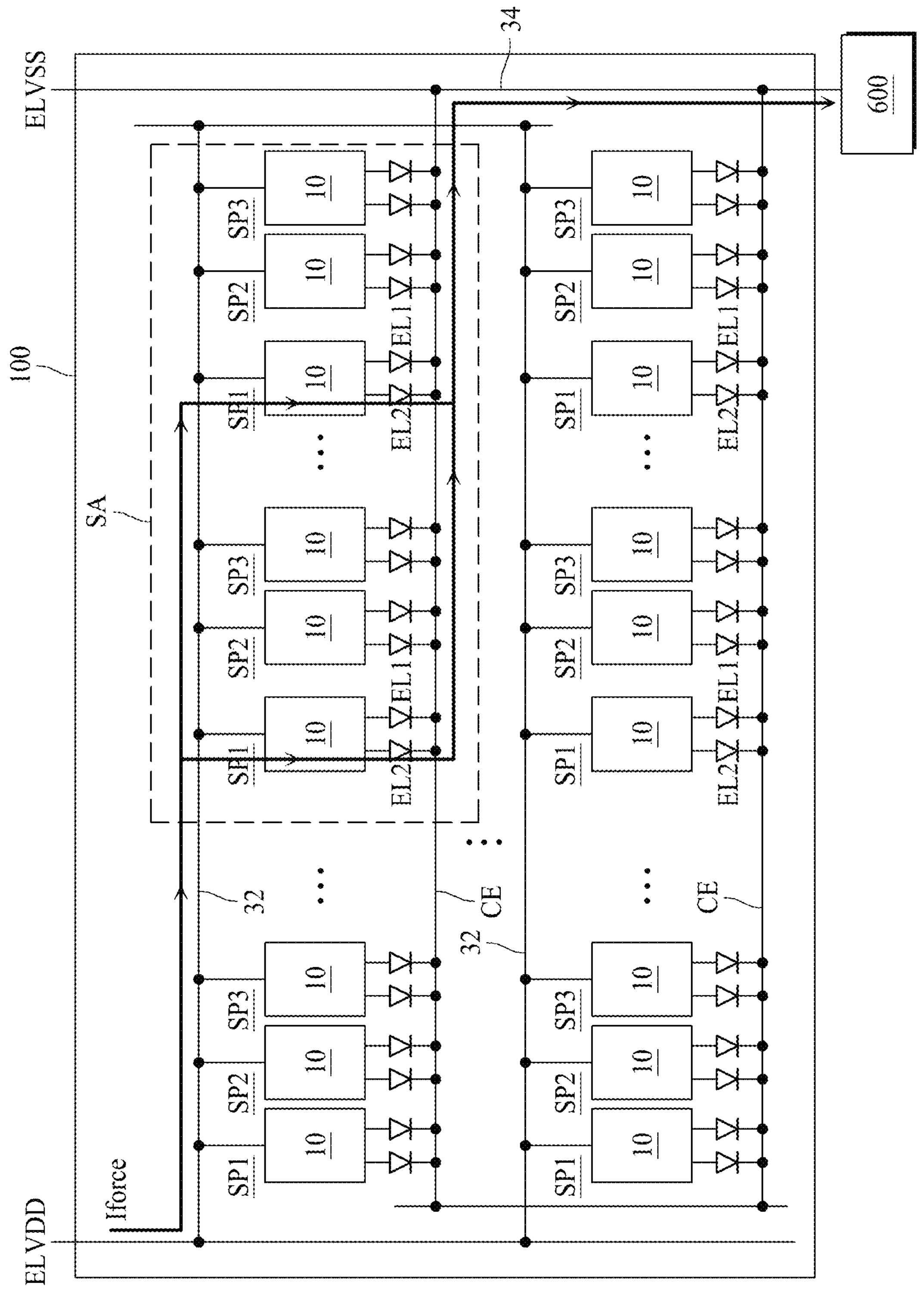
FIGS. 13A to 13C are diagrams illustrating a sensing path for each color of a second viewing angle mode of a sensing area in a display apparatus, according to one example embodiment of the present disclosure.
Figure 13B:
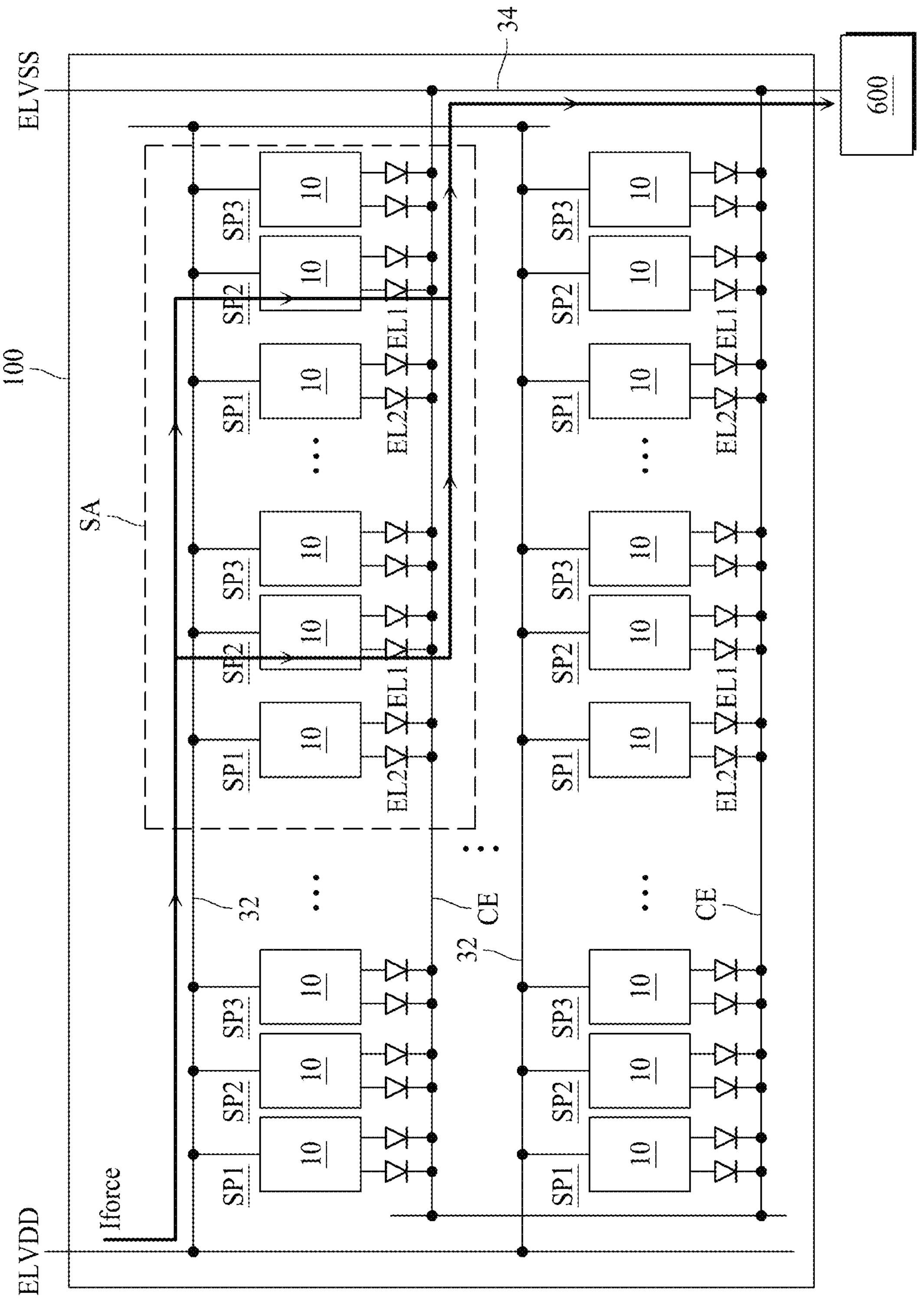
Figure 13C:
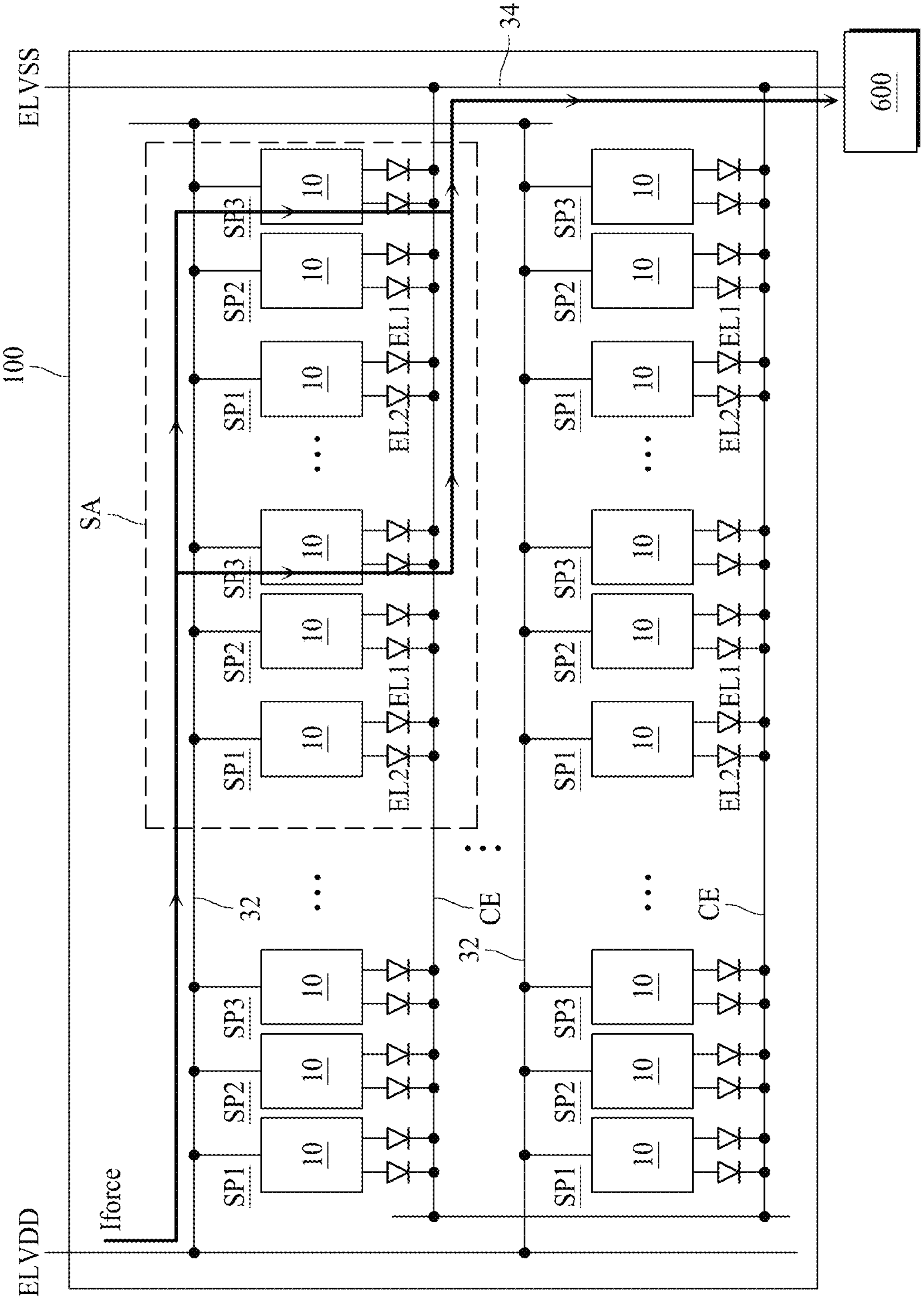

FIGS. 13A to 13C are diagrams illustrating a sensing path for each color of a second viewing angle mode of a sensing area in a display apparatus, according to one example embodiment of the present disclosure.

Referring to FIGS. 13A to 13C, the display apparatus according to one example embodiment may sense, using the sensing circuit 600, electrical characteristics of the second emitting element EL2 of the first color sub-pixels SP1 of the sensing area SA in the first sensing period of the second viewing angle mode, electrical characteristics of the second emitting element EL2 of the second color sub-pixels SP2 in the second sensing period, and electrical characteristics of the second emitting element EL1 of the third color subpixels SP3 in the third sensing period. The display apparatus according to one example embodiment may apply the positive low potential power voltage ELVSS the same as or different from the first viewing angle mode to the second power line 34 of the display panel 100 in the sensing period of the second viewing angle mode. The display apparatus according to one example embodiment may apply the positive low potential power voltage ELVSS different for each color to the second power line 34 of the display panel 100 in the first to third sensing periods of the second viewing angle mode, without being limited thereto.

Referring to FIG. 13A, the display apparatus according to one example embodiment may cause the second emitting element EL2 of the first sensing sub-pixels SP1 of the sensing area SA to emit in a white grayscale, and the non-sensing sub-pixels SP2, SP3 of the sensing area SA and the sub-pixels SP1, SP2, SP3 of the non-sensing area NSA to non-emit in a black grayscale. The sensing circuit 600 may sense electrical characteristics of the second emitting element EL2 of the first sensing sub-pixels SP1 using the set current Iforce flowing through the second emitting element EL2 of the first sensing sub-pixels SP1, the common cathode electrode CE and the second power line 34.

Referring to FIG. 13B, the display apparatus according to one example embodiment may cause the second emitting element EL2 of the second sensing sub-pixels SP2 of the sensing area SA to emit in a white grayscale, and the non-sensing sub-pixels SP1, SP3 of the sensing area SA and the sub-pixels SP1, SP2, SP3 of the non-sensing area NSA to non-emit in a black grayscale. The sensing circuit 600 may sense electrical characteristics of the second emitting element EL2 of the second sensing sub-pixels SP2 using the set current Iforce flowing through the second emitting element EL2 of the second sensing sub-pixels SP2, the common cathode electrode CE and the second power line 34.

Referring to FIG. 13C, the display apparatus according to one example embodiment may cause the second emitting element EL2 of the third sensing subpixels SP3 of the sensing area SA to emit in a white grayscale, and the non-sensing subpixels SP1, SP2 of the sensing area SA and the subpixels SP1, SP2, SP3 of the non-sensing area NSA to non-emit in a black grayscale. The sensing circuit 600 may sense electrical characteristics of the second emitting element EL2 of the third sensing sub-pixels SP3 using the set current Iforce flowing through the second emitting element EL2 of the third sensing sub-pixels SP3, the common cathode electrode CE and the second power line 34.

Figure 14:
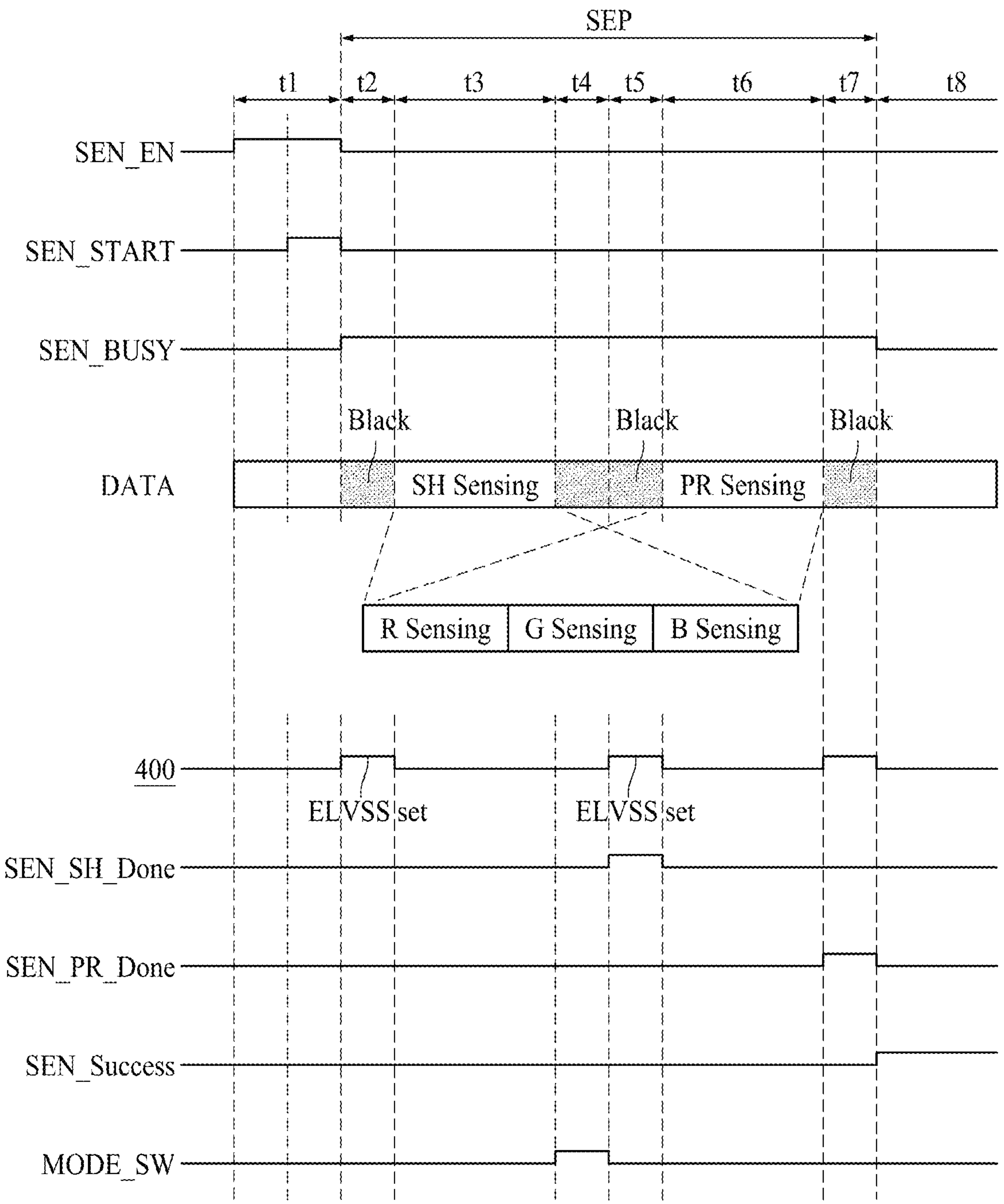
FIG. 14 is a waveform diagram illustrating an example sensing sequence of a display apparatus, according to one example embodiment of the present disclosure.

FIG. 14 is a waveform diagram illustrating an example sensing sequence of a display apparatus, according to one example embodiment of the present disclosure.

Referring to FIGS. 1 and 14, the display apparatus 1000 according to one example embodiment may operate in the sensing mode in response to a sensing enable signal SEN_EN and a sensing start signal SEN_START transmitted at a first time (t1) from the host system 2000, and the timing controller 400 may transmit a sensing status signal SEN_BUSY representing an operating period SEP of the sensing mode to the host system 2000.

The display apparatus 1000 according to one example embodiment may divide the operating period SEP of the sensing mode into a first viewing angle mode sensing SH Sensing period t3 and a second viewing angle mode sensing PR Sensing period t6. The display apparatus 1000 according to one example embodiment may divide each of the first and second viewing angle mode sensing periods t3, t6 into first to third sensing periods R Sensing, G Sensing, B Sensing separated by R, G, and B colors. In each of the first to third sensing periods R Sensing, G Sensing, B Sensing, the display apparatus 1000 according to an example embodiment may display the maximum grayscale image pattern of each color in the sensing area of the display panel 100 to sense the sensing area, and may display black grayscale in the non-sensing area.

The display apparatus 1000, according to one example embodiment, may display black grayscale data on the display panel 100 in each of the second period t2 before the first viewing angle mode sensing period t3, the fourth and fifth periods t4, t5 between the first and second viewing angle mode sensing periods t3, t6, and the seventh period t7 after the second viewing angle mode sensing period t6 of the operating period SEP of the sensing mode.

In the display apparatus 1000 according to one example embodiment, the power management circuit 700 may be supplied with and store a set value of the low potential power voltage ELVSS for the sensing mode from the timing controller 400 in the second period t2, the fifth period t5 when the display panel 100 displays a black grayscale, and generate and apply the positive low potential power voltage ELVSS to the display panel 100 during the sensing periods t3, t6. The power management circuit 700 may be supplied with and store the set value of the low potential power voltage ELVSS for the display mode from the timing controller 400 in the seventh period t7, and may generate and apply the low potential power voltage ELVSS for the display mode to the display panel 100 in the display period t8 after the sensing mode operating period SEP.

The timing controller 400 according to one example embodiment may output a sensing done signal SEN_SH_Done of the first viewing angle mode in the fifth period t5 after the sensing period t3 of the first viewing angle mode, and may output a sensing done signal SEN_PR_Done of the second viewing angle mode in the seventh period t7 after the sensing period t6 of the second viewing angle mode. The timing controller 400 according to one example embodiment may calculate a compensation gain based on the sensing data in the sensing mode operating period SEP, store it in the memory 500, and output a sensing success signal SEN_Success to the host system 2000.

In the fourth period t4 between the first and second viewing angle mode sensing periods t3, t6, the timing controller 400 according to one example embodiment may output a mode switching signal (MODE_SW) to switch the sensing mode of the first viewing angle mode to the sensing mode of the second viewing angle mode.

Figure 15A:
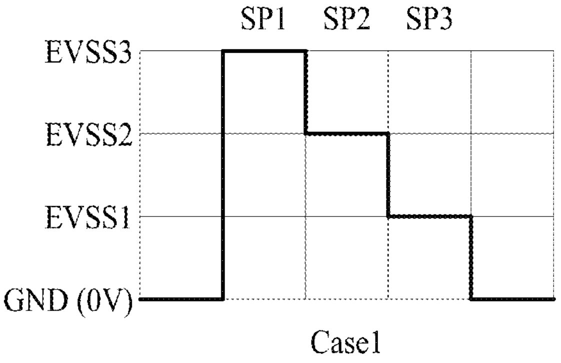
FIGS. 15A to 15C are illustrations of low potential power voltages for each color in a sensing mode of a display apparatus, according to one example embodiment of the present disclosure.
Figure 15B:
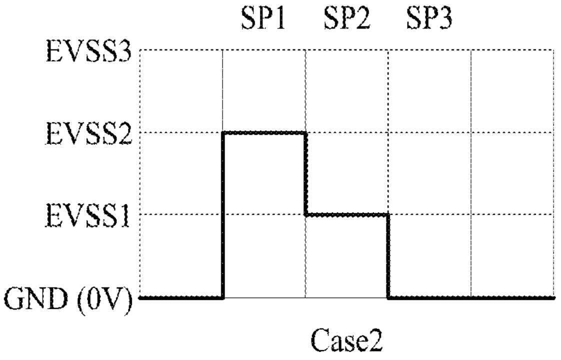
Figure 15C:
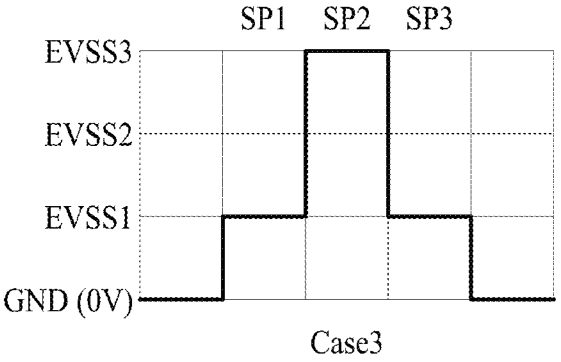

FIGS. 15A to 15C are illustrations of low potential power voltages for each color in a sensing mode of a display apparatus, according to one example embodiment of the present disclosure.

Referring to FIGS. 15A to 15C, the display apparatus according to one example embodiment may generate and apply the low potential power voltages ELVSS1, ELVSS2, ELVSS3, GND different for each color to the display panel in the sensing periods of the first to third color sub-pixels SP1, SP2, SP3.

Referring to FIG. 15A, in the display apparatus according to one example embodiment, as an example, the emitting elements EL1, EL2 of the red sub-pixel SP1 may have the smallest size, the emitting elements EL1, EL2 of the green sub-pixel SP2 may be larger than the size of the emitting elements EL1, EL2 of the red sub-pixel SP1, and the emitting elements EL1, EL2 of the blue sub-pixel SP3 may be larger than the size of the emitting elements EL1, EL2 of the green sub-pixel SP2. As the size of the emitting elements EL1, EL2 is smaller, the black grayscale current may be increased, thus the positive low potential power voltage ELVSS may be set higher. The display apparatus according to one example embodiment may apply a third positive low potential power voltage ELVSS3 to the display panel 100 when sensing the red sub-pixel SP1, and a second positive low potential power voltage ELVSS2 that is lower than the third positive low potential power voltage ELVSS3 when sensing the green sub-pixel SP2, and a first positive low potential power voltage ELVSS1 that is less than the second positive low potential power voltage ELVSS2 when sensing the blue sub-pixel SP3 to the display panel 100, but is not limited to. As an example, the display apparatus according to one example embodiment may apply the same power voltage to the display panel 100 when sensing at least two of the red sub-pixel SP1, the green sub-pixel SP2 and the blue sub-pixel SP3, without being limited thereto.

Referring to FIGS. 15B and 15C, the display apparatus according to one example embodiment may apply positive low potential power voltages ELVSS1, ELVSS2, ELVSS3 that are different for each color depending on the type of display apparatus Case1, Case2, Case3. Referring to FIGS. 15B, the display apparatus according to one example embodiment may apply a ground voltage GND equal to the display mode as the low potential power voltage when sensing the blue sub-pixel SP3.

Figure 16A:
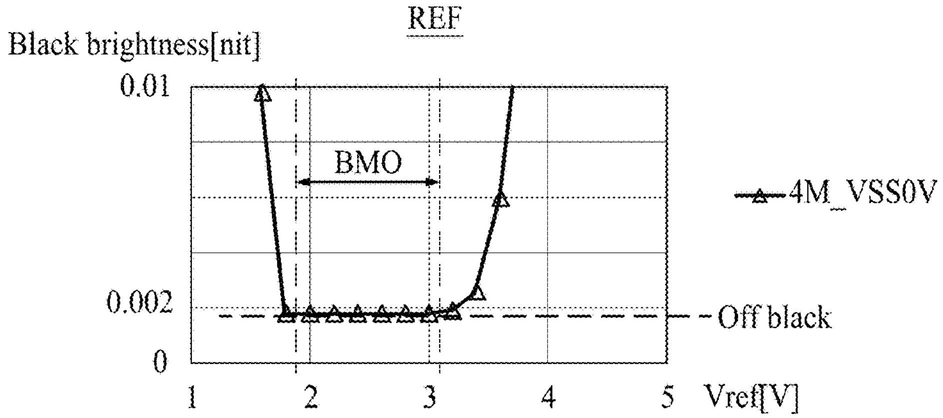
FIGS. 16A through 16C are graphs to illustrate a method for determining a positive low potential power voltage by considering a black data margin in a display apparatus, according to one example embodiment of the present disclosure.
Figure 16B:
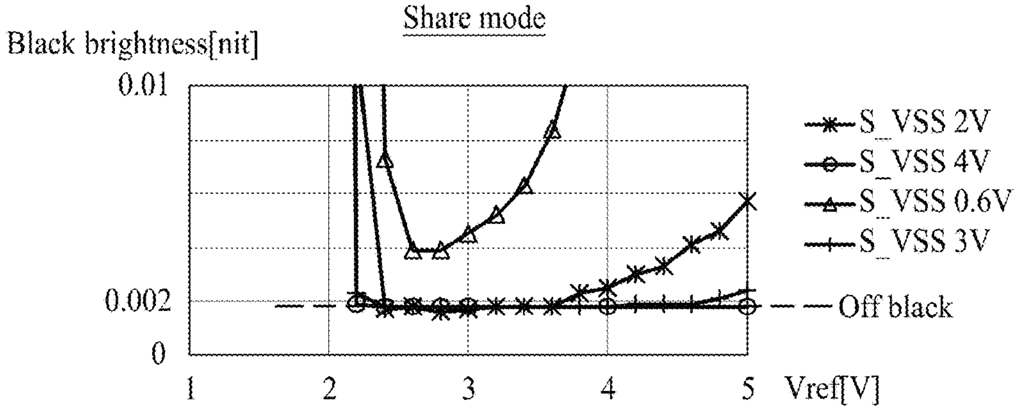
Figure 16C:
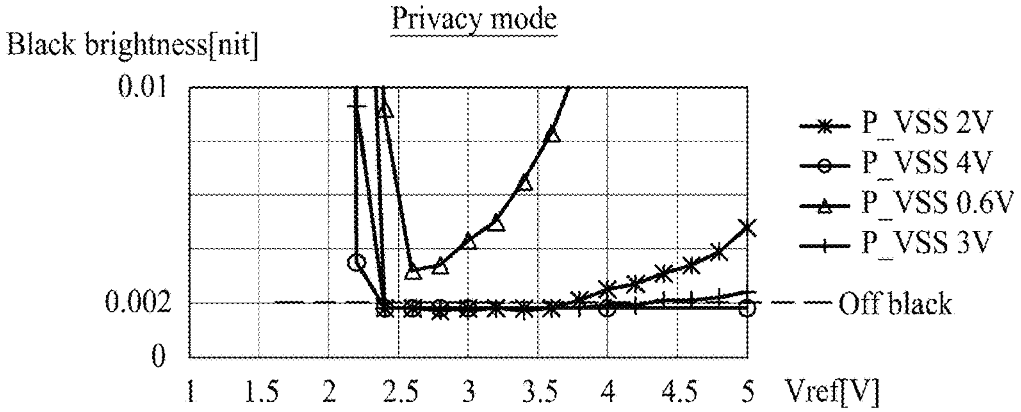

FIGS. 16A through 16C are graphs to illustrate a method for determining a positive low potential power voltage by considering a black data margin in a display apparatus, according to one example embodiment of the present disclosure.

In the sub-pixel SP shown in FIG. 7, the driving current of the emitting elements EL1, EL2 is determined by the voltage (Vdata-Vref) applied to the gate electrode of the driving transistor DT through the storage capacitor Cst, thus the black luminance of the emitting elements EL1, EL2 may be varied according to the variable margin of the reference voltage Vref even if the data voltage Vdata of the black grayscale is fixed.

Referring to FIG. 16A, in the reference display mode REF, when the normal low potential power voltage VSS=0V is applied to the light emitting element and the black grayscale data voltage Vdata is fixed, the variable margin BMO of the reference voltage Vref that the light emitting element is capable of stably displaying the black luminance 0.002 nit for is preferably about 1.2V, without being limited thereto.

The display apparatus according to one example embodiment may set the positive low potential power voltage VSS of the sensing mode in a range where the black luminance meets the variable margin of the reference voltage Vref of a stable 1.2 V.

Referring to FIG. 16B, it may be seen that range of the positive low potential power voltage VSS satisfying the variable margin of the reference voltage Vref of 1.2V in which black luminance is stable in the share mode, which is the first viewing angle mode, is about 2V to 4V.

Referring to FIG. 16C, it may be seen that the range of the positive low potential power voltage VSS satisfying the variable margin of the reference voltage Vref of 1.2V in which the black luminance is stable in Privacy mode, which is the second viewing angle mode, is also about 2V to 4V.

The display apparatus according to one example embodiment may set the positive low potential power voltage VSS of the sensing mode to 2V or more to ensure the variable margin of the reference voltage Vref of 1.2V at which the black luminance is stable, and may set it to 4V or less to reduce power consumption, but is not limited to.

Figure 17A:
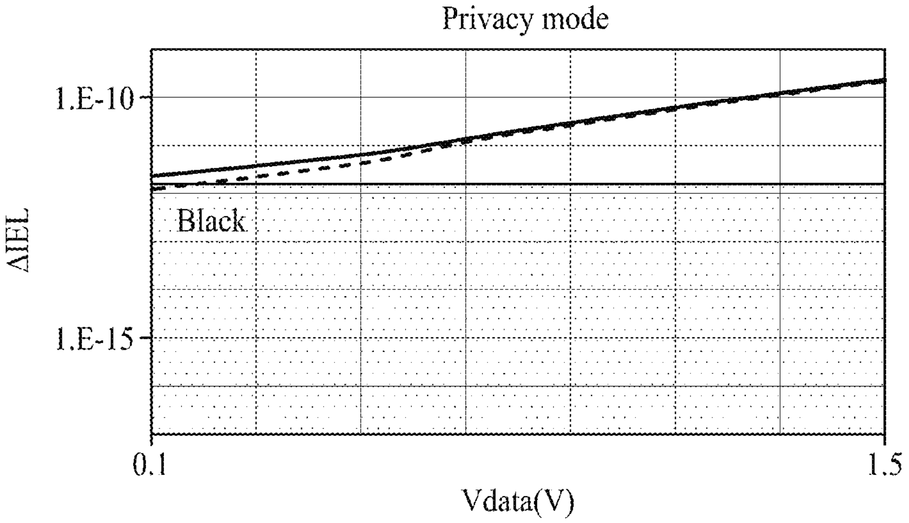
FIGS. 17A and 17B are graphs depicting black data voltage margins for each viewing angle mode in a display apparatus according to a comparative example of the related art.
Figure 17B:
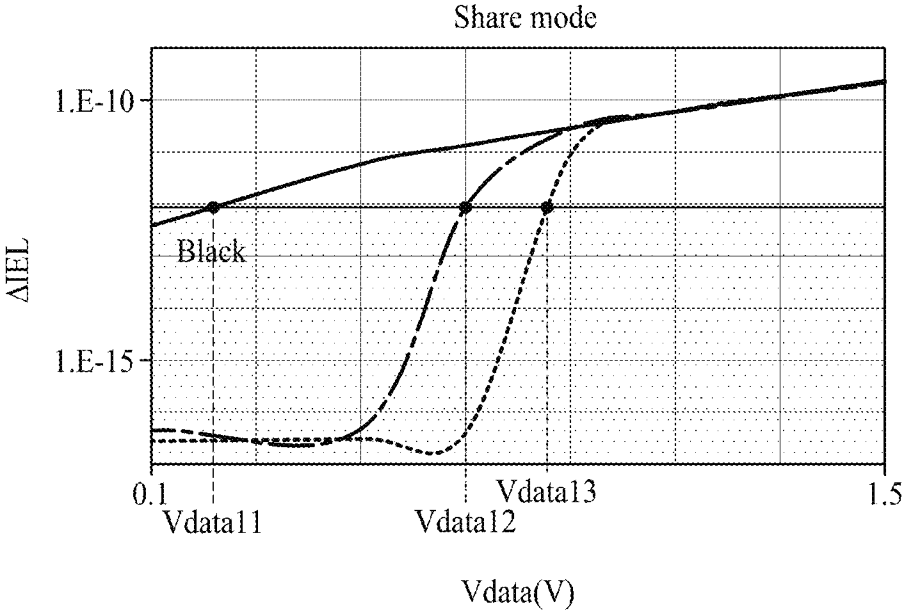
Figure 18A:
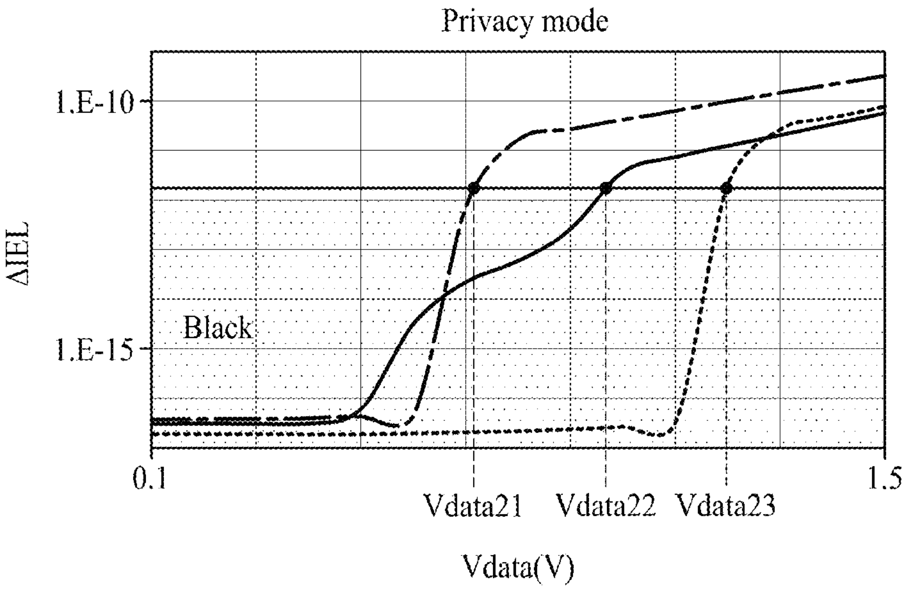
FIGS. 18A and 18B are graphs depicting black data voltage margins for each viewing angle mode in a display apparatus according to one example embodiment of the present disclosure.
Figure 18B:
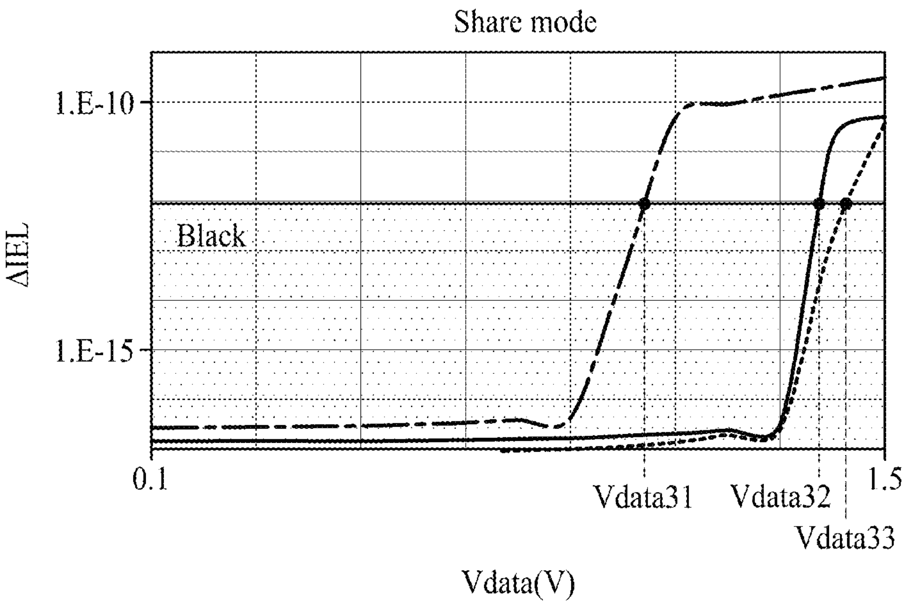
Figure 19:
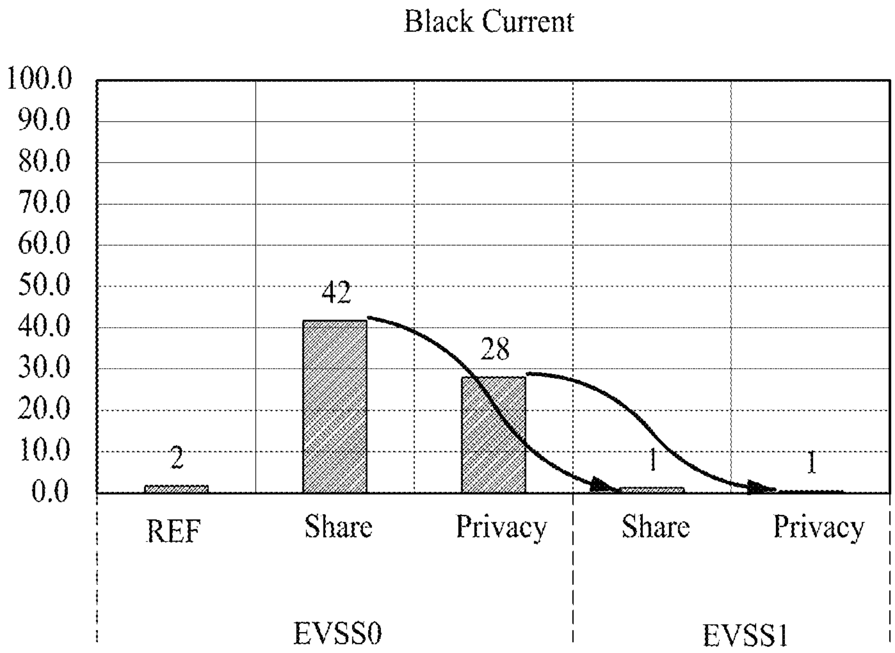
FIG. 19 is a diagram illustrating the effect of reducing black grayscale current in a display apparatus, according to one example embodiment of the present disclosure.

FIGS. 17A and 17B are graphs depicting black data voltage margins for each viewing angle mode in a display apparatus according to a comparative example of the related art, FIGS. 18A and 18B are graphs depicting black data voltage margins for each viewing angle mode in a display apparatus according to one example embodiment of the present disclosure, and FIG. 19 is a diagram illustrating the effect of reducing black grayscale current in a display apparatus, according to one example embodiment of the present disclosure.

Referring to FIGS. 17A and 17B and FIG. 19, the display apparatus according to the comparative example may utilize the low potential power voltage ELVSS0 in the sensing mode that is equal to the low potential power voltage ELVSS0 in the display mode. With reference to FIGS. 18A and 18B and FIG. 19, the display apparatus according to an example embodiment may utilize the positive low potential power voltage ELVSS1 in the sensing mode that is higher than the low potential power voltage ELVSS0 in the display mode.

Referring to FIGS. 17A and 19, it may be seen that when the display apparatus according to the comparative example utilizes the low potential power voltage ELVSS0 in the privacy sensing mode that is equal to the low potential power voltage ELVSS0 in the display mode and drives the second emitting element EL2 of the R, G, and B sub-pixels with the black grayscale data voltage Vdata, there is no data voltage margin to reach black luminance and the black grayscale current AIEL increases.

On the other hand, referring to FIGS. 18A and 19, the display apparatus according to one example embodiment may apply the positive low potential power voltage ELVSS1 in the privacy mode and drive the second emitting elements EL2 of the R, G, B sub-pixels with a black grayscale data voltage Vdata. In this case, it may be seen that the data voltage margins Vdata21, Vdata22, Vdata23 are sufficient for the second emitting elements EL2 of the R, G, B sub-pixels to reach the black luminance, and the black grayscale current AIEL decreases. In the display apparatus according to one example embodiment, the black data voltage margin Vdata21 that the second emitting element EL2 of the G sub-pixel reaches the black luminance, the black data voltage margin Vdata22 that the second emitting element EL2 of the R sub-pixel reaches the black luminance, and the black data voltage Vdata23 that the second emitting element EL2 of the B sub-pixel reaches the black luminance are sufficiently secured, thus the black grayscale current AIEL of the non-sensing sub-pixel in the sensing mode of the privacy mode may be reduced.

Referring to FIG. 17B, in the share mode of the display apparatus according to the comparative example, the first emitting element EL1 of the R, G, B sub-pixels may be driven using the low potential power voltage ELVSS0 equal to the low potential power voltage ELVSS0 in the display mode and the black data voltage Vdata. In this case, it may be seen that there is the data voltage margin Vdata11, Vdata12, Vdata13 at which the second emitting element EL2 of the R, G, B sub-pixels reaches the black luminance, but there is a lack of the data voltage margin Vdata11 at which the second emitting element EL2 of the R sub-pixel reaches the black luminance, resulting in an increase in the black grayscale current AIEL.

On the other hand, referring to FIG. 18A, the display apparatus according to one example embodiment may apply the positive low potential power voltage ELVSS1 in the share mode and drive the second emitting elements EL2 of the R, G, B sub-pixels with the data voltage Vdata of the black grayscale. In this case, it may be seen that the data voltage margins Vdata21, Vdata22, Vdata23 that the second emitting elements EL2 of the R, G, B sub-pixels reach the black luminance are sufficiently secured, thus the black grayscale current AIEL is reduced. In the display apparatus according to one example embodiment, the black data voltage margin Vdata31 at which the second emitting element EL2 of the G sub-pixel reaches the black luminance, the black data voltage margin Vdata32 at which the second emitting element EL2 of the R sub-pixel reaches the black luminance, and the black data voltage Vdata33 at which the second emitting element EL2 of the B sub-pixel reaches the black luminance sufficiently secured, thus the black grayscale current AIEL of the non-sensing sub-pixel in the sensing mode of the share mode may be reduced.

Referring to FIG. 19, in the display apparatus according to a comparative example, after applying the first low potential power voltage (ELVSS0=0V) to the display panel and displaying a black grayscale image in the share mode and the viewing angle mode, respectively, it may be seen that the black grayscale currents measured through the second power line are 42 μA and 28 μA in the share mode and the privacy mode, respectively, which is higher than the set current Iforce.

On the other hand, in the display apparatus 1000 according to one example embodiment, after applying the second low potential power voltage (ELVSS1=3V) higher than the first low potential power voltage ELVSS0 of the display mode to the display panel 100 and displaying the black grayscale image in each of the share mode and the viewing angle mode, it may be seen that the black grayscale currents measured through the second power line 34 in each of the share mode and the privacy mode decreases to a level of 1 μA, which is lower than the set current Iforce.

Figure 20A:
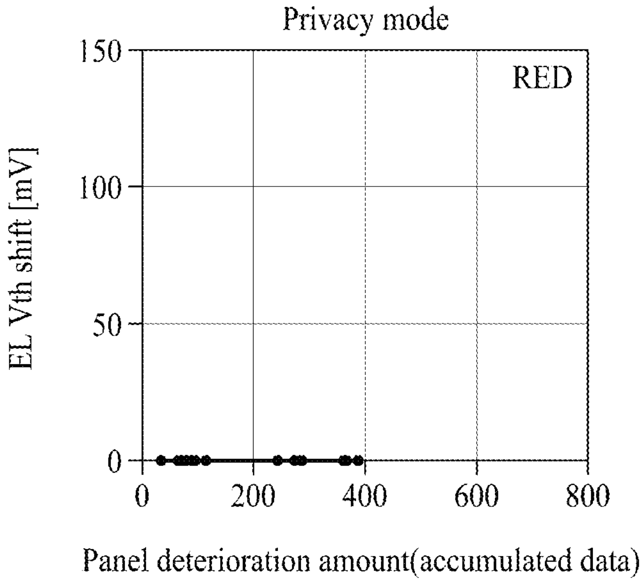
FIGS. 20A to 20C are graphs depicting a correlation between the amount of panel deterioration and the amount of threshold voltage shift of an emitting element, for each color, in a privacy mode of a display apparatus according to a comparative example of the related art.
Figure 20B:
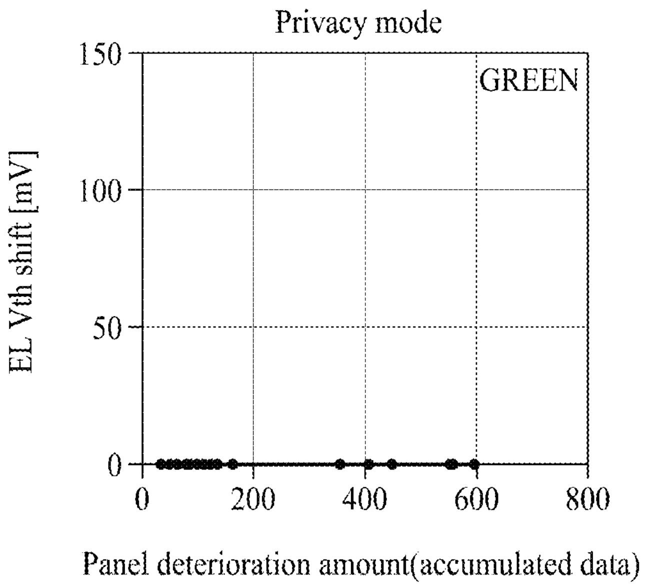
Figure 20C:
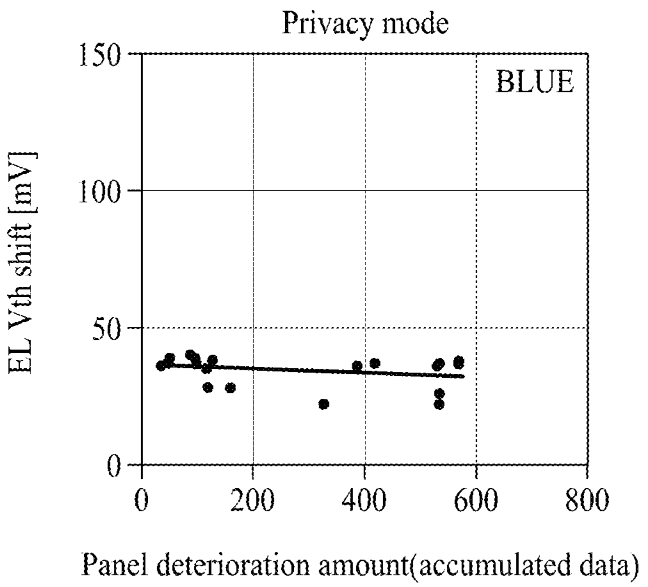
Figure 21A:
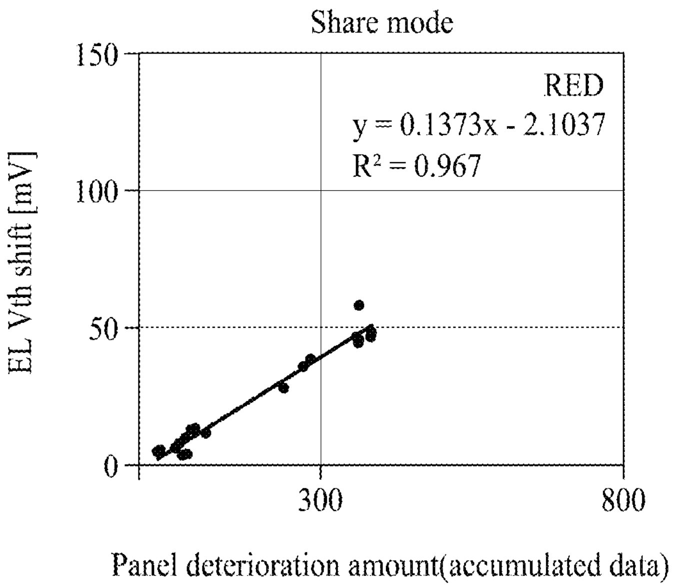
FIGS. 21A to 21C are graphs depicting a correlation between the amount of panel deterioration and the threshold voltage shift of an emitting element, for each color, in a share mode of a display apparatus according to one example embodiment of the present disclosure.
Figure 21B:
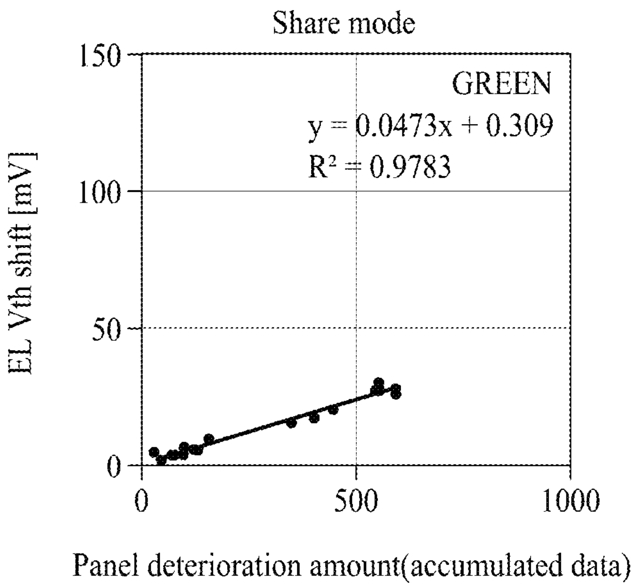
Figure 21C:
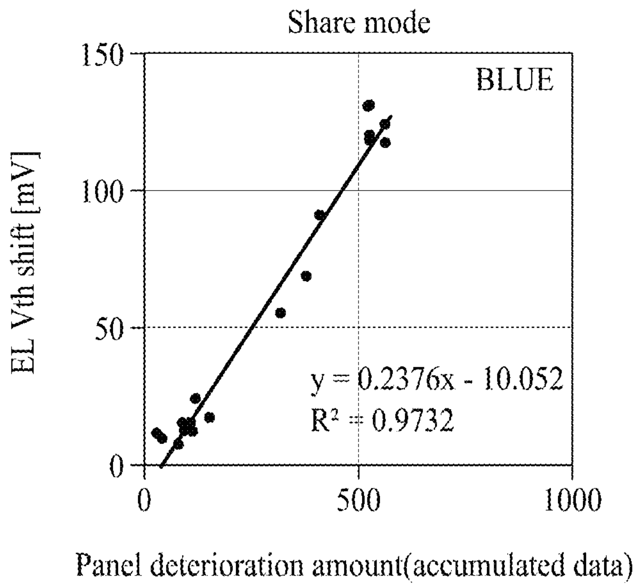
Figure 22A:
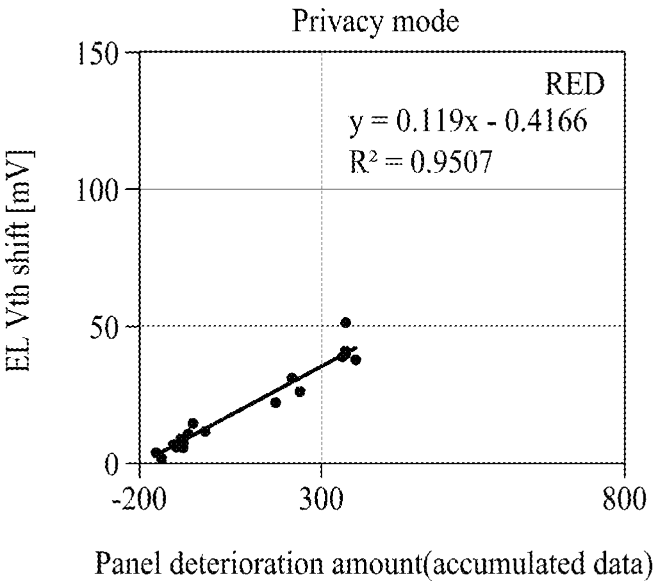
FIGS. 22A to 22C are graphs depicting a correlation between the amount of panel deterioration and the amount of threshold voltage shift of an emitting element, for each color, in privacy mode of a display apparatus according to one example embodiment of the present disclosure.
Figure 22B:
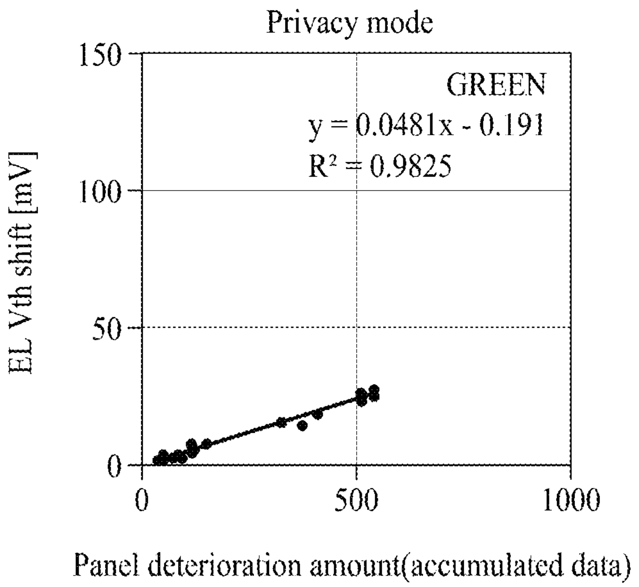
Figure 22C:
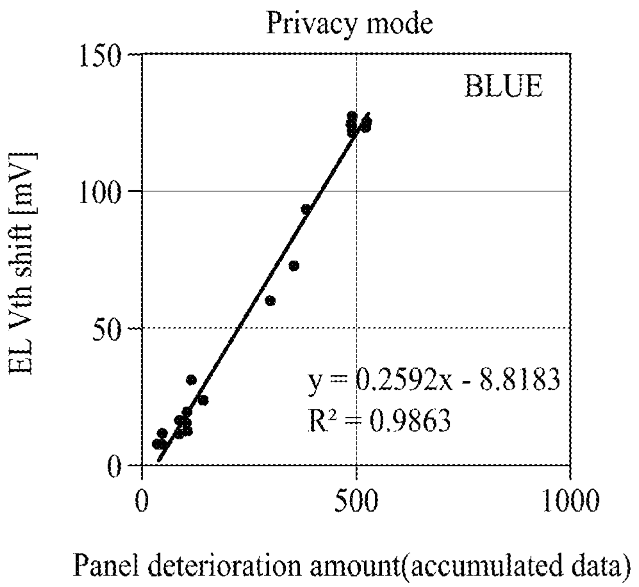

FIGS. 20A to 20C are graphs depicting a correlation between the amount of panel deterioration and the amount of threshold voltage shift of an emitting element, for each color, in a privacy mode of a display apparatus according to a comparative example of the related art, FIGS. 21A to 21C are graphs depicting a correlation between the amount of panel deterioration and the threshold voltage shift of an emitting element, for each color, in a share mode of a display apparatus according to one example embodiment of the present disclosure, FIGS. 22A to 22C are graphs depicting a correlation between the amount of panel deterioration and the amount of threshold voltage shift of an emitting element, for each color, in privacy mode of a display apparatus according to one example embodiment of the present disclosure.

In FIGS. 20A to 22C, the panel deterioration amount is a value predicted from the accumulated data of the image data, and the threshold voltage Vth shift amount of the emitting element EL is a value calculated based on the difference between the sensing data of the maximum deterioration area and the sensing data of the minimum deterioration area.

Referring to FIGS. 20A to 20C, it may be seen that the sensing accuracy of the threshold voltage shift (EL Vth Shift) of the second emitting element sensed by R, G, and B colors in the privacy mode of the display apparatus according to the comparative example is degraded under the influence of the black current and is not correlated with the amount of panel deterioration.

Referring to FIGS. 21A to 21C, the sensing accuracy of the threshold voltage shift (EL Vth Shift) amount of the first emitting element EL1 sensed for each color of R, G, B color may be improved by reducing the influence of the black grayscale current by using the positive low potential power voltage in the sensing mode of the share mode of the display apparatus according to one example embodiment. Accordingly, the increasing trend of the threshold voltage shift of the first emitting element EL1 for each color of R, G, and B color has a high correlation R2 of more than 0.95 with the increasing trend of the panel deterioration amount, indicating that the sensing accuracy of the threshold voltage shift amount of the first emitting element EL1 for each color according to the panel deterioration amount is improved.

Referring to FIGS. 22A to 22C, in the sensing mode of the privacy mode of the display apparatus according to one example embodiment, the sensing accuracy of the threshold voltage shift (EL Vth Shift) amount of the second emitting element EL2 sensed for each color of R, G, B color may be improved by reducing the influence of the black grayscale current by using the positive low potential power voltage. Accordingly, the increasing trend of the threshold voltage shift amount of the second emitting element EL2 for each color of R, G, and B color has a high correlation R2 of more than 0.95 with the increasing trend of the panel deterioration amount, indicating that the sensing accuracy of the threshold voltage shift amount of the second emitting element EL2 for each color according to the panel deterioration amount is improved.

A display apparatus according to some aspects may include a display panel comprising a plurality of sub-pixels, a first power line shared by the plurality of sub-pixels, and a second power line shared by the plurality of sub-pixels, a driver configured to drive the display panel, a power management circuit configured to apply a high potential power voltage to the first power line and apply a low potential power voltage to the second power line, and a sensing circuit sensing electrical characteristics of a sensing area of the display panel through the second power line to output sensing data, wherein the power management circuit applies a first low potential power voltage to the second power line in a display mode, and a second low potential power voltage higher than the first low potential power voltage to the second power line in a sensing mode.

In the display apparatus according to some aspects, each of the plurality of sub-pixels may include a first emitting element, a second emitting element; and a pixel circuit configured to drive the first emitting element in a first viewing angle mode and drive the second emitting in a second viewing angle mode.

In the display apparatus according to some aspects, each of the plurality of sub-pixels further may include a first light control element overlapping on the first emitting element to provide light having the first viewing angle, and a second light control element overlapping on the second emitting element to provide light having the second viewing angle different from the first viewing angle.

In the display apparatus according to some aspects, the sensing mode may comprise a first viewing angle mode sensing period and a second viewing angle mode sensing period, wherein, in the first viewing angle mode sensing period, the sensing circuit senses a first electrical characteristics of the sensing area through a first sensing path passing through the first power line, the first emitting element, and the second power line in sensing area of the display panel driving in the first viewing angle mode, and wherein, in the second viewing angle mode sensing period, the sensing circuit senses a second electrical characteristics of the sensing area through a second sensing path passing through the first power line, the second emitting element, and the second power line in sensing area of the display panel driving in the second viewing angle mode.

In the display apparatus according to some aspects, the power management circuit, in the first viewing angle mode sensing period and the second viewing angle mode sensing period, may generate and applies the second low potential power voltage differently for each mode.

In the display apparatus according to some aspects, each of the sensing period of the first viewing angle mode and the sensing period of the second viewing mode may comprise a first color sensing period sensing first color sub-pixels in the sensing area, a second color sensing period sensing second color sub-pixels in the sensing area, and a third color sensing period sensing third color sub-pixels in the sensing area.

In the display apparatus according to some aspects, the power management circuit may generate and apply the second low potential power voltage differently for each color in the first, second, and third color sensing period.

In the display apparatus according to some aspects, in the sensing mode, the driver may display maximum grayscale data in the sensing area of the display panel and may display minimum grayscale data in a non-sensing area of the display panel.

In the display apparatus according to some aspects, in the sensing mode, the driver may display maximum grayscale data on the sub-pixels sensed in the sensing area of the display panel, and may display minimum grayscale data on the sub-pixels not sensed in the sensing area of the display panel and on sub-pixels in a non-sensing area of the display panel.

In the display apparatus according to some aspects, the driver may determine a first sensing area a second sensing area in the display panel based on the result of accumulating image data, wherein the first sensing area is the maximum deterioration area and the second sensing area may be the minimum deterioration area, wherein the driver may be applied a first sensing data and a second sensing data through the sensing circuit, and wherein the first sensing data may be obtained by sensing the electrical characteristics of the first sensing area, the second sensing data is obtained by sensing the electrical characteristics of the second sensing area through the sensing circuit.

In the display apparatus according to some aspects, the driver may be scale the first sensing data in units of sub-pixel to calculate a third sensing data, wherein the driver may scale the second sensing data in units of sub-pixel to calculate a fourth sensing data, wherein the driver may calculate a threshold voltage shift of each of the emitting elements based on the difference between the third sensing data and the fourth sensing data, and wherein the driver may calculate a compensation gain of each of the sub-pixels based on the threshold voltage shift of each of the emitting elements and stores the compensation gain in a memory.

A display apparatus according to some aspects may include a display panel comprising a plurality of sub-pixels, a first power line shared by the plurality of sub-pixels, and a second power line shared by the plurality of sub-pixels, the plurality of sub-pixels having a first emitting element and a second emitting element, a sensing circuit configured to sense electrical characteristics of a sensing area of the display panel through the second power line to output sensing data, and a power management circuit configured to apply a high potential power voltage for a sensing mode and a set current to the first power line in the sensing mode and apply a low potential power voltage for the sensing mode to the second power line in the sensing mode, wherein each of the plurality of sub-pixels further may comprise a pixel circuit configured to drive the first emitting element in a first viewing angle mode driving and drive the second emitting in a second viewing angle mode, and wherein the power management circuit may apply a higher positive voltage than a low potential power voltage for a display mode as a low potential power voltage for the sensing mode.

In the display apparatus according to some aspects, each of the plurality of sub-pixels may include a first light control element overlapping on the first emitting element to provide light having the first viewing angle, and a second light control overlapping on the second emitting element to provide light having the second viewing angle narrower than the first viewing angle.

In the display apparatus according to some aspects, the sensing mode may comprise a first viewing angle mode sensing period and a second viewing angle mode sensing period, wherein in the first viewing angle mode sensing period, the sensing circuit may sense a first electrical characteristics of the sensing area through a first sensing path passing through the first power line, the first emitting element, and the second power line in sensing area of the display panel driving in the first viewing angle mode, and wherein the second viewing angle mode sensing period, the sensing circuit may sense a second electrical characteristics of the sensing area through a second sensing path passing through the first power line, the second emitting element, and the second power line in sensing area of the display panel driving in the second viewing angle mode.

In the display apparatus according to some aspects, the power management circuit, in the first viewing angle mode sensing period and the second viewing angle mode sensing period, may generate and apply the second low potential power voltage for the sensing mode differently for each mode.

In the display apparatus according to some aspects, each of the sensing period of the first viewing angle mode and the sensing period of the second viewing mode may comprise a first color sensing period sensing first color sub-pixels in the sensing area, a second color sensing period sensing second color sub-pixels in the sensing area, and a third color sensing period sensing third color sub-pixels in the sensing area.

In the display apparatus according to some aspects, the power management circuit may generate and apply the low potential power voltage for the sensing mode differently for each color in the first, second, and third color sensing period.

In the display apparatus according to some aspects, in the sensing mode, the sub-pixels sensed in a sensing area of the display panel may display maximum grayscale data, the sub-pixels not sensed in a sensing area and the sub-pixels in a non-sensing area display minimum grayscale data.

In the display apparatus according to some aspects, a minimum grayscale current, which flows to the sub-pixels displaying the minimum grayscale data by the low potential power voltage for the sensing mode may be less than a minimum current by the low potential power voltage for the display mode.

In the display apparatus according to some aspects, the second low potential power voltage for the sensing mode may be set to a voltage more than or equal to 2V and less than or equal to 4V.

As described above, the display apparatus according to one example embodiment may apply the positive low potential power voltage ELVSS to the display panel in the sensing mode, thus minimize the black grayscale current of the non-sensing sub-pixel, thereby improving the sensing accuracy of the electrical characteristics of the sensing sub-pixel using the second power line, resulting in improved afterimage compensation performance.

The display apparatus according to one example embodiment may improve the afterimage compensation performance by improving the sensing accuracy of changes in electrical characteristics of the emitting element using the second power line, even if the emitting element of the sub-pixel is driven in a time-division manner, regardless of the time-division driving of the sub-pixel.

The display apparatus according to one example embodiment may further improve the sensing accuracy of changes in electrical characteristics of the emitting element using the second power line for each sensing mode or for each color by applying the low potential power voltage in the sensing mode differentially for each sensing mode or for each color, and may further improve the afterimage compensation performance.

The display apparatus according to one example embodiment may improve the sensing accuracy of the changes in the electrical characteristics of the emitting element regardless of the time-division driving of the sub-pixels, thus improve the afterimage compensation performance, thereby increasing the afterimage lifetime of the emitting element and achieving a low power consumption effect, as well.

The above-described feature, structure, and effect of the present disclosure are included in at least one example embodiment of the present disclosure, but are not limited to only one example embodiment. Furthermore, the feature, structure, and effect described in at least one example embodiment of the present disclosure may be implemented through combination or modification of other embodiments by those skilled in the art. Therefore, content associated with the combination and modification should be construed as being within the scope of the present disclosure.

It will be apparent to those skilled in the art that various modifications and variations can be made in the present disclosure without departing from the spirit or scope of the disclosures. Thus, it is intended that the present disclosure covers the modifications and variations of this disclosure including the appended claims and their equivalents.

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display apparatus, comprising:

a display panel comprising a plurality of sub-pixels, a first power line shared by the plurality of sub-pixels, and a second power line shared by the plurality of sub-pixels;

a power management circuit configured to apply a high potential power voltage to the first power line and apply a low potential power voltage to the second power line; and a sensing circuit configured to sense electrical characteristics of at least one sub-pixel of the plurality of sub-pixels through the second power line to output sensing data in a sensing mode, wherein the power management circuit is configured to apply a first low potential power voltage to the second power line in a display mode, and a second low potential power voltage higher than the first low potential power voltage to the second power line in the sensing mode, wherein each of the plurality of sub-pixels is configured to operate in one of a first viewing angle mode and a second viewing angle mode, wherein the sensing mode comprises a first viewing angle mode sensing period and a second viewing angle mode sensing period, and wherein the power management circuit, in the first viewing angle mode sensing period or the second viewing angle mode sensing period, is configured to generate and apply the second low potential power voltage differently between the first viewing angle mode and the second viewing angle mode.

2. The display apparatus of claim 1, wherein each of the plurality of sub-pixels comprises:

a first emitting element, a second emitting element; and a pixel circuit configured to drive the first emitting element and the second emitting element in a time-division manner.

3. The display apparatus of claim 2, wherein the pixel circuit is configured to drive the first emitting element in the first viewing angle mode and drive the second emitting element in the second viewing angle mode.

4. The display apparatus of claim 3, wherein each of the plurality of sub-pixels further comprises:

a first light control element overlapping on the first emitting element to provide light having a first viewing angle; and a second light control element overlapping on the second emitting element to provide light having a second viewing angle different from the first viewing angle.

5. The display apparatus of claim 3, wherein, in the first viewing angle mode sensing period, the sensing circuit is configured to sense a first electrical characteristics of a sensing area of the display panel through a first sensing path passing through the first power line, the first emitting element, and the second power line in the sensing area of the display panel driving in the first viewing angle mode, and wherein, in the second viewing angle mode sensing period, the sensing circuit is configured to sense a second electrical characteristics of the sensing area of the display panel through a second sensing path passing through the first power line, the second emitting element, and the second power line in the sensing area of the display panel driving in the second viewing angle mode.

6. The display apparatus of claim 5, wherein each of the first viewing angle mode sensing period and the second viewing angle mode sensing period comprises:

a first color sensing period sensing first color sub-pixels in the sensing area;

a second color sensing period sensing second color sub-pixels in the sensing area; and a third color sensing period sensing third color sub-pixels in the sensing area.

7. The display apparatus of claim 6, wherein the power management circuit is configured to generate and apply the second low potential power voltage differently in the first, second, and third color sensing period.

8. The display apparatus of claim 2, wherein a size of the first emitting element is different from a size of the second emitting element in each of the plurality of sub-pixels.

9. The display apparatus of claim 2, wherein the plurality of sub-pixels includes a first color sub-pixel, a second color sub-pixel, and a third color sub-pixel, each including the first emitting element and the second emitting element, and wherein sizes of the first emitting elements of at least two of the first color sub-pixel, the second color sub-pixel, and the third color sub-pixel are different from each other, and wherein sizes of the second emitting elements of at least two of the first color sub-pixel, the second color sub-pixel, and the third color sub-pixel are different from each other, or a number of light emitting areas of the second emitting elements of at least two of the first color sub-pixel, the second color sub-pixel, and the third color sub-pixel are different from each other.

10. The display apparatus of claim 1, wherein the second power line is connected to the sensing circuit via a second power supply line through a circuit film, and wherein the sensing circuit is configured to sense the electrical characteristics of the at least one sub-pixel of the plurality of sub-pixels by detecting a voltage at an end of the second power supply line using a set current flowing through the at least one sub-pixel.

11. The display apparatus of claim 1, further comprising a driver configured to drive the display panel, wherein, in the sensing mode, the driver is configured to display maximum grayscale data in a sensing area of the display panel and displays minimum grayscale data in a non-sensing area of the display panel.

12. The display apparatus of claim 11, wherein the sensing area is an area predicted to be a maximum deterioration area in the display panel using accumulated results of an image data, and including a plurality of sub-pixels.

13. The display apparatus of claim 1, further comprising a driver configured to drive the display panel, wherein, in the sensing mode, the driver is configured to display maximum grayscale data on the sub-pixels sensed in a sensing area of the display panel, and to display minimum grayscale data on the sub-pixels not sensed in the sensing area of the display panel and on sub-pixels in a non-sensing area of the display panel.

14. The display apparatus of claim 1, further comprising a driver configured to drive the display panel, wherein the driver is configured to determine a first sensing area and a second sensing area in the display panel based on accumulated results of an image data, wherein the first sensing area is an area predicted to be a maximum deterioration area and the second sensing area is an area predicted to be a minimum deterioration area, wherein the driver is configured to be supplied with a first sensing data and a second sensing data through the sensing circuit, and wherein the first sensing data is configured to be obtained by sensing the electrical characteristics of the first sensing area through the sensing circuit, and the second sensing data is obtained by sensing the electrical characteristics of the second sensing area through the sensing circuit.

15. The display apparatus of claim 14, further comprising a driver configured to drive the display panel, wherein the driver is configured to scale the first sensing data in units of sub-pixel to calculate a third sensing data, wherein the driver is configured to scale the second sensing data in units of sub-pixel to calculate a fourth sensing data, wherein the driver is configured to calculate a threshold voltage shift of each of emitting elements of each of the sub-pixels based on the difference between the third sensing data and the fourth sensing data, and wherein the driver is configured to calculate a compensation gain of each of the sub-pixels based on the threshold voltage shift of each of the emitting elements of each of the sub-pixels and stores the compensation gain in a memory.

16. The display apparatus of claim 1, wherein the second low potential power voltage for the sensing mode is set to a voltage greater than or equal to 2V and smaller than or equal to 4V.

17. A vehicle, comprising the display apparatus according to claim 1.

18. The vehicle of claim 17, wherein the display apparatus is applied in a co-driver display of the vehicle.

19. The vehicle of claim 18, wherein the display apparatus is operated in the first viewing angle mode when a driver is not driving, and is operated in the second viewing angle mode when the driver is driving.

20. A display apparatus, comprising:

a display panel comprising a plurality of sub-pixels, a first power line shared by the plurality of sub-pixels, and a second power line shared by the plurality of sub-pixels, the plurality of sub-pixels each having a first emitting element and a second emitting element;

a sensing circuit configured to sense electrical characteristics of a sensing area of the display panel through the second power line to output sensing data; and a power management circuit configured to apply a high potential power voltage and a set current to the first power line in a sensing mode and apply a low potential power voltage for the sensing mode to the second power line in the sensing mode, wherein each of the plurality of sub-pixels further comprise a pixel circuit configured to drive the first emitting element in a first viewing angle mode and drive the second emitting in a second viewing angle mode, and wherein the power management circuit is configured to apply a positive voltage higher than a low potential power voltage for a display mode as the low potential power voltage for the sensing mode, wherein the sensing mode comprises a first viewing angle mode sensing period and a second viewing angle mode sensing period, and wherein the power management circuit, in the first viewing angle mode sensing period or the second viewing angle mode sensing period, is configured to generate and apply the second low potential power voltage differently between the first viewing angle mode and the second viewing angle mode.

21. The display apparatus of claim 20, wherein each of the plurality of sub-pixels comprises:

a first light control element overlapping on the first emitting element to provide light having a first viewing angle; and a second light control overlapping on the second emitting element to provide light having a second viewing angle narrower than the first viewing angle.

22. The display apparatus of claim 21, wherein in the first viewing angle mode sensing period, the sensing circuit is configured to sense a first electrical characteristics of the sensing area through a first sensing path passing through the first power line, the first emitting element, and the second power line in the sensing area of the display panel driving in the first viewing angle mode, and wherein the second viewing angle mode sensing period, the sensing circuit is configured to sense a second electrical characteristics of the sensing area through a second sensing path passing through the first power line, the second emitting element, and the second power line in the sensing area of the display panel driving in the second viewing angle mode.

23. The display apparatus of claim 22, wherein each of the first viewing angle mode sensing period and the second viewing angle mode sensing period comprises;

a first color sensing period sensing first color sub-pixels in the sensing area;

a second color sensing period sensing second color sub-pixels in the sensing area; and a third color sensing period sensing third color sub-pixels in the sensing area.

24. The display apparatus of claim 23, wherein the power management circuit is configured to generate and apply the low potential power voltage for the sensing mode differently in the first, second, and third color sensing period.

25. The display apparatus of claim 20, wherein in the sensing mode, the sub-pixels sensed in the sensing area of the display panel are configured to display maximum grayscale data, the sub-pixels not sensed in the sensing area and the sub-pixels in a non-sensing area are configured to display minimum grayscale data.

26. The display apparatus of claim 20, wherein a minimum grayscale current, which flows to the sub-pixels displaying the minimum grayscale data by the low potential power voltage for the sensing mode is less than a minimum grayscale current caused by the low potential power voltage for the display mode.

27. The display apparatus of claim 26, wherein the low potential power voltage for the sensing mode is set to a voltage greater than or equal to 2V and smaller than or equal to 4V.

* * * * *